(12) United States Patent
Liberg et al.

(10) Patent No.: US 12,034,515 B2
(45) Date of Patent: Jul. 9, 2024

(54) METHODS FOR INDICATING POLARIZATION CAPABILITIES OF USER EQUIPMENT IN A NON-TERRESTRIAL NETWORK (NTN)

(71) Applicant: Telefonaktiebolaget LM Ericsson (publ), Stockholm (SE)

(72) Inventors: Olof Liberg, Enskede (SE); Xingqin Lin, San Jose, CA (US); Talha Khan, Santa Clara, CA (US); Helka-Liina Määttänen, Helsinki (FI); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 17/762,221

(22) PCT Filed: Sep. 23, 2020

(86) PCT No.: PCT/EP2020/076572
§ 371 (c)(1),
(2) Date: Mar. 21, 2022

(87) PCT Pub. No.: WO2021/058567
PCT Pub. Date: Apr. 1, 2021

(65) Prior Publication Data
US 2022/0337308 A1 Oct. 20, 2022

Related U.S. Application Data

(60) Provisional application No. 62/905,716, filed on Sep. 25, 2019.

(51) Int. Cl.
*H04B 7/10* (2017.01)
*H04B 7/06* (2006.01)
*H04W 84/06* (2009.01)

(52) U.S. Cl.
CPC ............. *H04B 7/10* (2013.01); *H04B 7/0628* (2013.01); *H04W 84/06* (2013.01)

(58) Field of Classification Search
CPC ......... H04B 7/0628; H04B 7/10; H04W 8/24; H04W 84/06
See application file for complete search history.

(56) References Cited

U.S. PATENT DOCUMENTS

2013/0273870 A1    10/2013  Shi
2018/0063693 A1    3/2018   Chakraborty et al.
(Continued)

FOREIGN PATENT DOCUMENTS

EP    2930978 A1    10/2015
WO    9922465 A1    5/1999
WO    2019137939 A1    7/2019

OTHER PUBLICATIONS

"3GPP TR 38.811 V15.2.0", 3rd Generation Partnership Project; Technical Specification Group Radio Access Network; Study on New Radio (NR) to support non-terrestrial networks (Release 15), Sep. 2019, pp. 1-126.
(Continued)

*Primary Examiner* — David S Huang
(74) *Attorney, Agent, or Firm* — Sage Patent Group

(57) ABSTRACT

Embodiments include methods for operating a user equipment (UE) in a non-terrestrial network (NTN) that utilizes one or more polarization modes for serving one or more cells. Such methods include sending, to a network node, an indication of one or more polarization capabilities of the UE. Such methods also include transmitting and/or receiving one or more signals or channels in a first cell of the NTN according to the indicated polarization capabilities of the UE. In some embodiments, the indicated polarization capabilities of the UE include: a UE type; one or more polarization modes supported by the UE; a polarization corre-
(Continued)

spondence between uplink and downlink signals that is supported by the UE; and/or a list of antenna panels supported by the UE and polarization modes supported by the antenna panels. Other embodiments include complementary methods for operating network nodes, and UEs and network nodes configured to perform such methods.

16 Claims, 12 Drawing Sheets

(56) References Cited

U.S. PATENT DOCUMENTS

2020/0322028 A1* 10/2020 Tosato ................ H04B 7/0639
2021/0143871 A1*  5/2021 Ho ...................... H04W 72/04

OTHER PUBLICATIONS

"3GPP TS 36.213 V15.6.0", 3rd Generation Partnership Project; Technical Specification Group Radio Access Network; Evolved Universal Terrestrial Radio Access (E-UTRA); Physical layer procedures (Release 15), Jun. 2019, pp. 1-551.

"3GPP TS 38.306 V15.4.0", 3rd Generation Partnership Project; Technical Specification Group Radio Access Network; NR; User Equipment (UE) radio access capabilities (Release 15), Dec. 2018, pp. 1-40.

"3GPP TS 38.331 V15.0.0", 3rd Generation Partnership Project; Technical Specification Group Radio Access Network NR Radio Resource Control (RRC) protocol specification (Release 15), Dec. 2017, pp. 1-188.

"On physical layer control procedures for NTN", 3GPP TSG-RAN WG1 Meeting #98bis, R1-1910981, Chongqing, China, Oct. 14-20, 2019, pp. 1-11.

"Study on solutions evaluation for NR to support Non Terrestrial Network", 3GPP TSG RAN meeting #80; RP-181370; La Jolla, USA, Jun. 11-14, 2018, pp. 1-5.

"3GPP TR 38.811 V15.1.0", 3rd Generation Partnership Project; Technical Specification Group Radio Access Network; Study on New Radio (NR) to support non-terrestrial networks (Release 15), Jun. 2019, pp. 1-126.

* cited by examiner

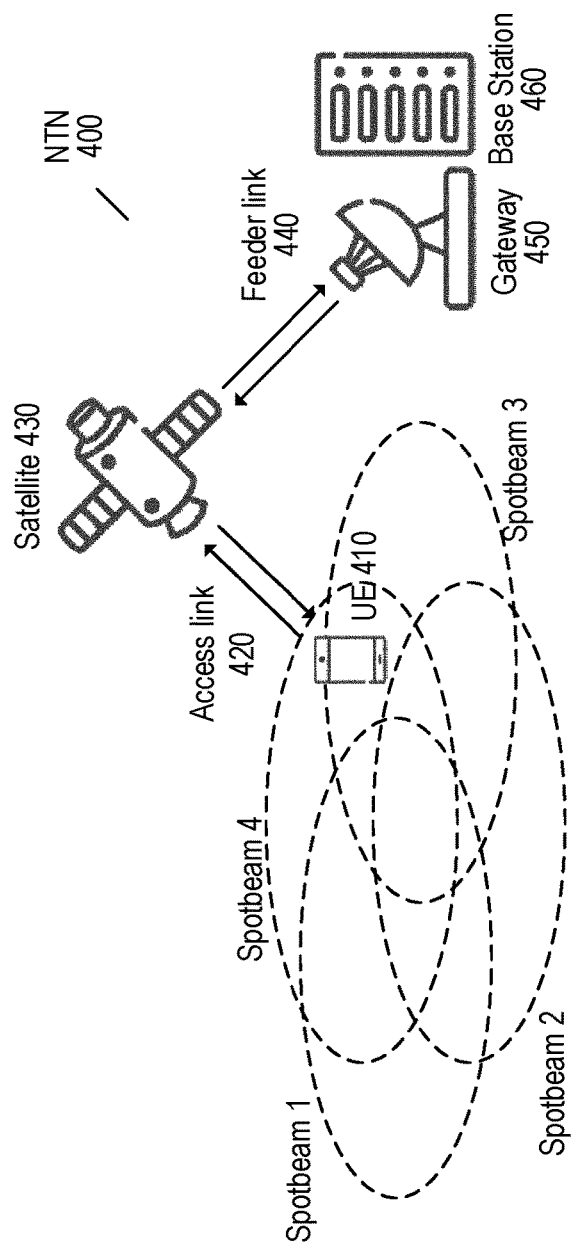
FIG. 4A
FIG. 4B
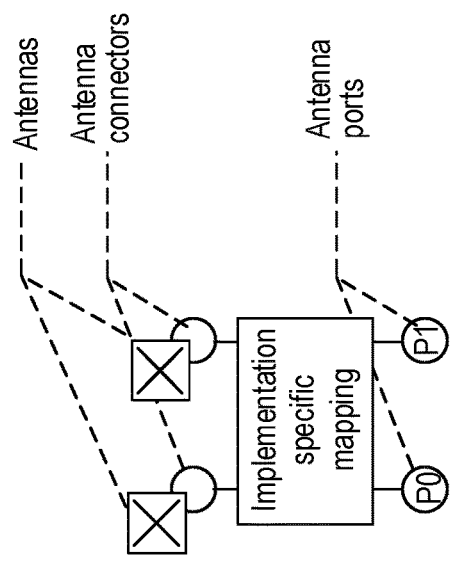
FIG. 5

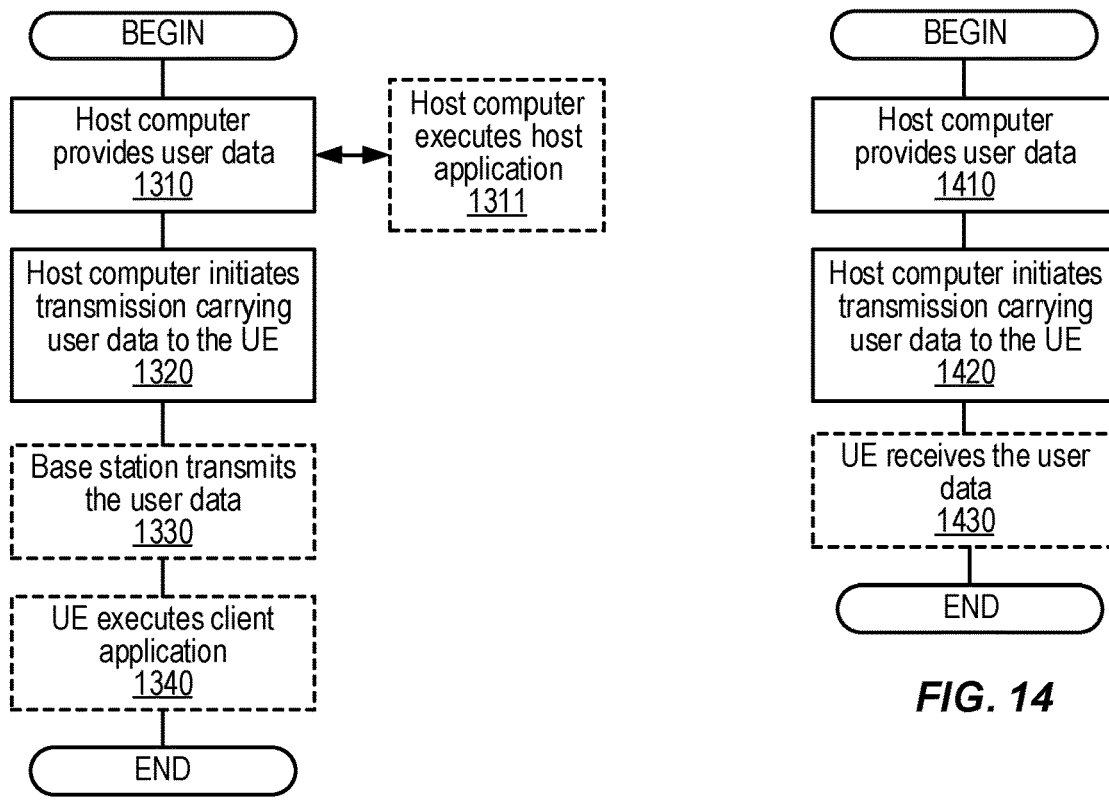
FIG. 13
FIG. 14
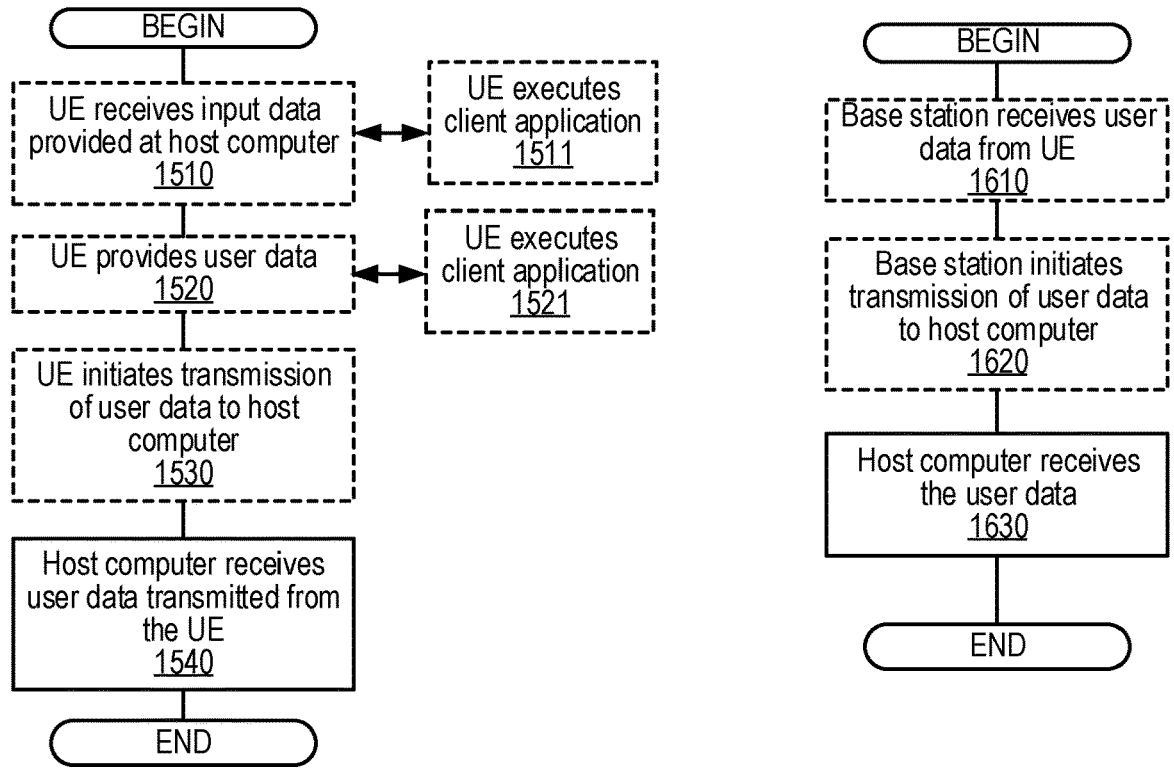
FIG. 15
FIG. 16

METHODS FOR INDICATING POLARIZATION CAPABILITIES OF USER EQUIPMENT IN A NON-TERRESTRIAL NETWORK (NTN)

TECHNICAL FIELD

The present application relates generally to the field of wireless communication networks, and more specifically to improvements in communications between a user equipment (UE) and a Long Term Evolution (LTE) or New Radio (NR) radio access network (RAN) adapted to a non-terrestrial network (NTN) scenario.

BACKGROUND

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-low latency critical communications (URLCC), side-link device-to-device (D2D), and several other use cases. The present disclosure relates generally to NR, but the following description of previous-generation technology is provided for context since it shares many features with NR.

Long Term Evolution (LTE) is an umbrella term for so-called fourth generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/SGW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RCC_IDLE state is known in the EPC and has an assigned IP address, but is not known to the serving eNB (e.g., there is no stored context).

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth.

As shown in FIG. 3, a combination of a particular subcarrier in a particular symbol is known as a resource element (RE). Each RE is used to transmit a particular number of bits, depending on the type of modulation and/or bit-mapping constellation used for that RE. The radio resources of the LTE PHY are also defined in terms of physical resource blocks (PRBs). Each PRB spans $N^{RB}_{sc}$ sub-carriers over the duration of a slot (i.e., $N^{DL}_{symb}$ or $N^{DL}_{symb}$ symbols), where $N^{RB}_{sc}$ is typically either 12 or 24. A PRB spanning the same $N^{RB}_{sc}$ subcarriers during an entire subframe (i.e., $2N^{DL}_{symb}$ symbols) is known as a PRB pair. For normal CP and 15-KHz SCS, a PRB pair includes 168 REs.

An exemplary LTE FDD UL radio frame can be configured in a similar manner as the exemplary FDD DL radio frame shown in FIG. 3. Using terminology consistent with the above DL description, each UL slot consists of $N^{UL}_{symb}$ OFDM symbols, each of which is comprised of $N_{sc}$ OFDM subcarriers.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

Fifth-generation NR technology shares many features with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE that has some properties similar to a "suspended" condition for LTE. Furthermore, NR is targeted to support deployment in very-high-frequency spectrum (referred to as "millimeter wave" or "mmW") in addition lower-frequency spectrum (e.g., similar to LTE).

In addition to providing coverage via cells, as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

In Rel-15, 3GPP also started preparing NR for operation in a Non-Terrestrial Network (NTN). The work was performed within the study item "NR to support Non-Terrestrial Networks" and resulted in publication of 3GPP TR 38.811 (v15.1.0). The work to prepare NR for NTN operation continued in Rel-16 under the study item "Solutions for NR to support Non-Terrestrial Network". The interest in adapting LTE for NTN operation is also growing. Consequently, 3GPP is considering introducing NTN support for both LTE and NR in Rel-17.

Even so, current LTE and NR technologies were developed for terrestrial cellular networks, and adapting them to NTN can create various issues, problems, and/or drawbacks for operation of networks and UEs.

SUMMARY

Exemplary embodiments disclosed herein address these problems, issues, and/or drawbacks of existing solutions by providing a flexible but efficient approach for user equipment (UEs) to inform an NTN (e.g., a 3GPP NTN using LTE and/or NR radio access technologies) of their polarization capabilities, such as types or modes of polarization supported.

Embodiments include methods (e.g., procedures) for operating a user equipment (UE) in a non-terrestrial network (NTN) that utilizes one or more polarization modes for serving one or more cells. These exemplary methods can be performed by a UE (e.g., wireless device).

These exemplary methods can include sending, to a network node, an indication of one or more polarization capabilities of the UE. These exemplary methods can also include transmitting and/or receiving one or more signals or channels in a first cell of the NTN according to the indicated polarization capabilities of the UE.

In various embodiments, the indicated polarization capabilities of the UE can include any of the following:
- a UE type (e.g., associated with mandatory support of such polarization capabilities);
- one or more polarization modes supported by the UE;
- a polarization correspondence between uplink and downlink signals that is supported by the UE; and
- a list of antenna panels supported by the UE and polarization modes supported by the respective antenna panels.

In some embodiments, the one or more polarization modes indicated as supported by the UE include any of the following: linear polarization, horizontal polarization, vertical polarization, circular polarization, right-hand circular polarization, and left-hand circular polarization.

In some embodiments, these exemplary methods can also include receiving, from the network node, an indication of one or more of the following polarization capabilities of the first cell: one or more polarization modes; and a polarization correspondence between uplink and downlink signals.

In some of these embodiments, the indicated polarization capabilities of the first cell comprise a UE access restriction to the first cell, and can be received according to one of the following:
- broadcast in the first cell; or
- as a dedicated message to the UE in response to the indication of the one or more polarization capabilities of the UE.

In some of these embodiments, the indicated polarization capabilities of the UE are a subset of the indicated polarization capabilities of the first cell. For example, the UE can select the subset from the polarization capabilities of the first cell that were received via broadcast.

In some of these embodiments, these exemplary methods can also include refraining from transmitting signals or channels in the first cell based on determining at least one of the following:
- that polarization modes supported by the UE do not match any of the indicated polarization modes of the first cell; and
- that polarization correspondence supported by the UE does not match the indicated polarization correspondence of the first cell.

In some embodiments, the transmitting and/or receiving operations can include receiving a downlink signal or channel in the first cell according to a first polarization mode; determining a second polarization mode for an uplink signal or channel based on the first polarization mode and between uplink and downlink signals that is indicated as supported by the UE; and transmitting the uplink signal or channel in the first cell according to the second polarization mode.

In some of these embodiments, the downlink signal or channel can be one of the following: a primary synchronization signal, a secondary synchronization signal, and a broadcast control channel (BCCH). Likewise, the uplink signal or channel can be a random-access channel (RACH) or a Physical Uplink Shared Channel (PUSCH). In such embodiments, the second polarization mode can be the same as the first polarization mode.

In other embodiments, the transmitting and/or receiving operations can include receiving, from the network node, a radio resource configuration based on the polarization capabilities indicated as supported by the UE; and transmitting and/or receiving the one or more signals or channels according to the radio resource configuration. In various embodiments, the radio resource configuration can include any of the following: aggregation factor, modulation and coding scheme (MCS) table, time domain resource allocation (TDRA) table, frequency resource allocation, block error rate (BER) target, physical resource block (PRB) bundling configuration, physical downlink shared channel (PDSCH) mapping, physical uplink shared channel (PUSCH) transmission scheme, and hybrid ARQ (HARD) process configuration.

In some embodiments, the one or more signals or channels can be transmitted and/or received in the first cell according to a first polarization mode indicated as supported by the UE. In such embodiments, these exemplary methods can also include transmitting and/or receiving one or more further signals or channels in the first cell or a second cell, according to a second polarization mode indicated as supported by the UE. The second polarization mode can be orthogonal to the first polarization mode.

In some of these embodiments, the one or more signals or channels can include a first physical downlink channel (e.g., PDSCH, PDCCH) received in the first cell, and the one or more further signals or channels can include a second physical downlink channel (e.g., of the same type) received in the first cell or in the second cell. In such embodiments, the first and second physical downlink channels can be received concurrently by the UE. Concurrent transmission of uplink physical channels (e.g., PUCCH, PUSCH) in this manner is also possible.

In some of these embodiments, the one or more signals or channels can be transmitted and/or received using a first antenna panel supporting the first polarization mode, and the one or more further signals or channels can be transmitted and/or received using a second antenna panel supporting the second polarization mode.

Other embodiments include methods (e.g., procedures) for operating a network node in a non-terrestrial network (NTN) that uses one or more polarization modes for serving one or more cells. These exemplary methods can be performed by a network node (e.g., satellite, gateway, base station, etc.).

These exemplary methods can include receiving, from a user equipment (UE) in a first cell of the NTN, an indication of one or more polarization capabilities of the UE. These exemplary methods and/or procedures can also include transmitting and/or receiving one or more signals or channels in the first cell according to the indicated polarization capabilities of the UE. In various embodiments, the indicated polarization capabilities of the UE can include any of the properties and/or features summarized above in relation to UE embodiments.

In some embodiments, these exemplary methods can also include transmitting, to at least one UE, an indication of one or more of the following polarization capabilities of the first cell: one or more polarization modes; and a polarization correspondence between uplink and downlink signals. In some of these embodiments, the indicated polarization capabilities of the first cell comprise a UE access restriction to the first cell, and can be transmitted according to one of the following:
- broadcast in the first cell; or
- as a dedicated message to the UE in response to the indication of the one or more polarization capabilities of the UE.

In some of these embodiments, the indicated polarization capabilities of the UE are a subset of the indicated polarization capabilities of the first cell.

In some embodiments, these exemplary methods can also include selecting a second cell for a mobility operation for the UE, based on the second cell supporting one of the polarization modes indicated as supported by the UE.

In various embodiments, the network node operations of transmitting and/or receiving the one or more signals or channels can include any of the properties, features, and/or sub-operations summarized above in relation to UE embodiments. For example, the transmitting and/or receiving operations for network node embodiments can be complementary to transmitting and/or receiving operations for UE embodiments summarized above.

In some embodiments, the one or more signals or channels can be transmitted and/or received in the first cell according to a first polarization mode that is indicated as supported by the UE. In such embodiments, these exemplary methods can also include transmitting and/or receiving one or more further signals or channels in the first cell or a second cell, according to a second polarization mode that is indicated as supported by the UE. The second polarization mode can be orthogonal to the first polarization mode.

In some of these embodiments, the one or more signals or channels can include a first physical downlink channel (e.g., PDSCH, PDCCH) transmitted in the first cell, and the one or more further signals or channels can include a second physical downlink channel (e.g., of the same type as the first) transmitted in the first cell or in the second cell. In such embodiments, the first and second physical downlink channels can be transmitted concurrently. Concurrent reception of uplink physical channels (e.g., PUCCH, PUSCH) in this manner is also possible.

Other embodiments include user equipment (UEs, e.g., wireless devices) and network nodes (e.g., satellites, gateways, base stations, or components thereof) that are configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 4A-4B illustrate an exemplary configuration of a satellite radio access network (RAN), also referred to as a non-terrestrial network (NTN).

FIG. 5 illustrates an exemplary mapping between antenna ports, antenna connectors, and antennas.

FIGS. 13-16 are flow diagrams illustrating various exemplary methods (e.g., procedures) implemented in a communication system, according to various exemplary embodiments of the present disclosure.

DETAILED DESCRIPTION

Figure 1:
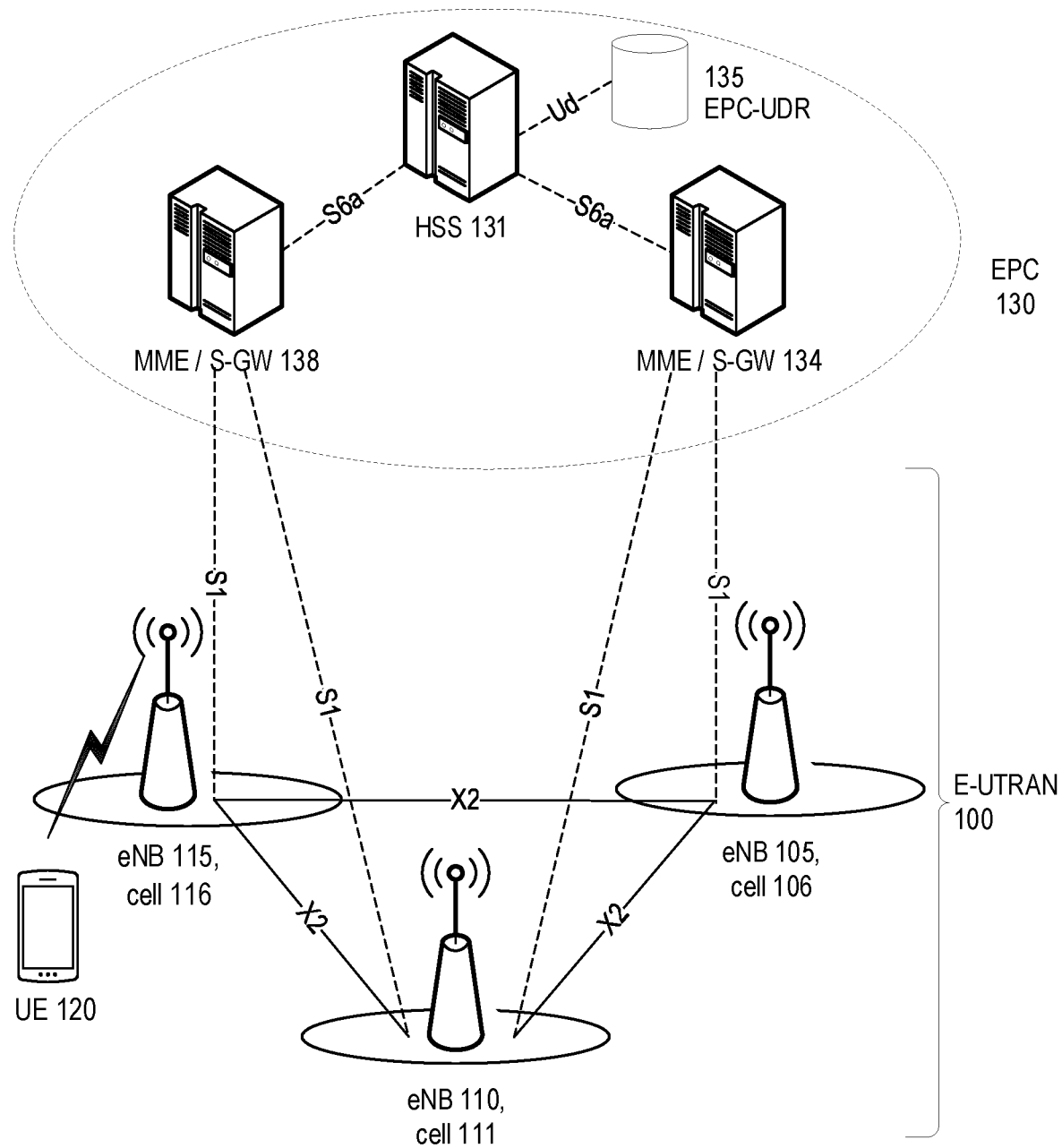
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
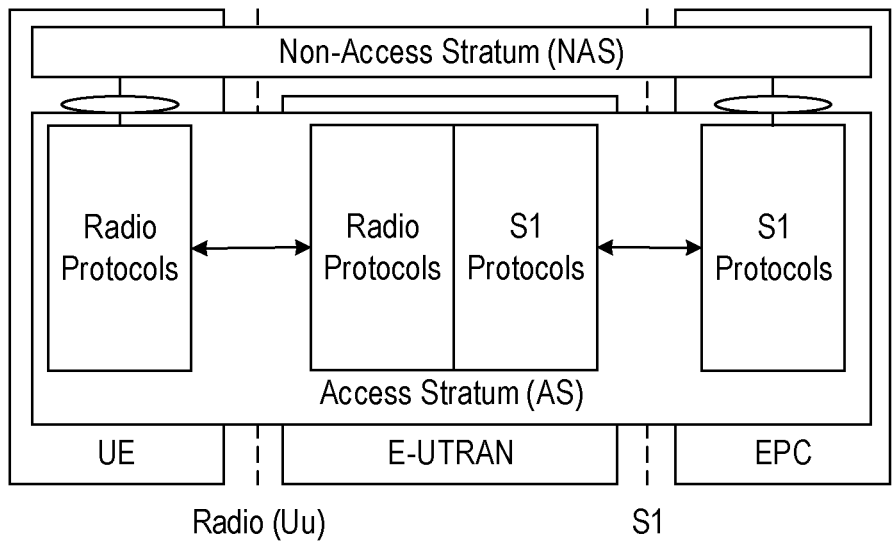
FIG. 2A is a high-level block diagram of an exemplary E-UTRAN architecture in terms of its constituent components, protocols, and interfaces.
Figure 2B:
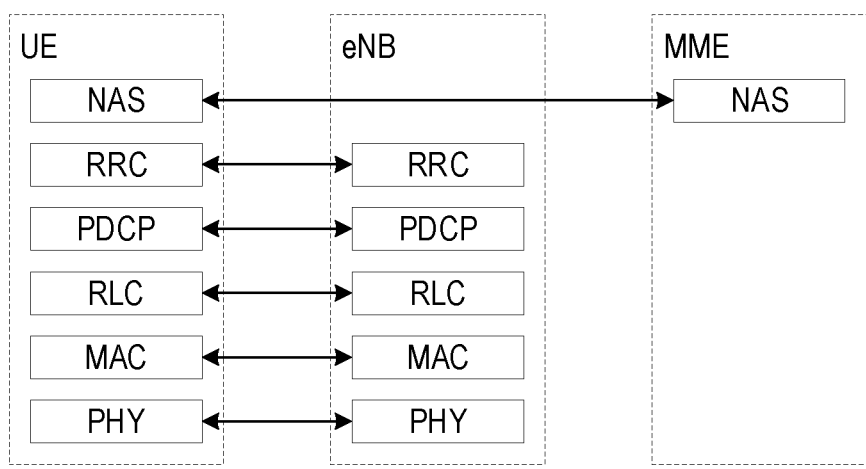
FIG. 2B is a block diagram of exemplary protocol layers of the control-plane portion of the radio (Uu) interface between a user equipment (UE) and the E-UTRAN.
Figure 3:
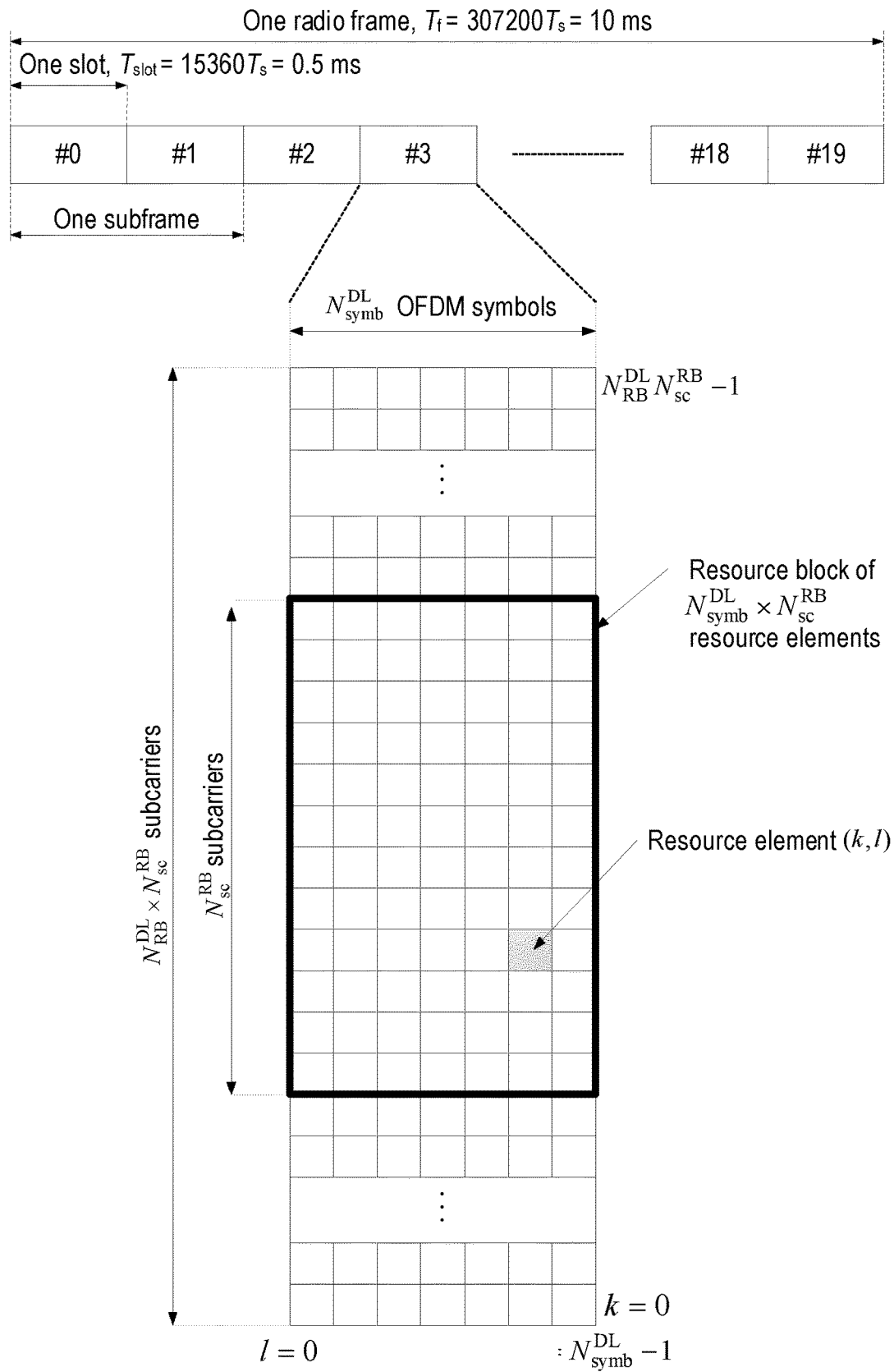
FIG. 3 is a block diagram of an exemplary downlink (DL) LTE radio frame structures used for frequency division duplexing (FDD) operation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), a relay node, or a non-terrestrial access node (e.g., satellite or gateway).

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the terms "wireless device" and "user equipment" (or "UE" for short) are used interchangeably herein.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams. In addition, although the embodiments of the present disclosure are described in terms of non-terrestrial networks (NTNs), such embodiments are equally applicable to any wireless network dominated by line-of-sight conditions, including terrestrial networks.

As briefly mentioned above, current LTE and NR technologies were developed for terrestrial cellular networks and adapting them to non-terrestrial networks (NTN) can create various issues, problems, and/or drawbacks for operation of networks and UEs. For example, the LTE and NR technologies are not prepared to support NTN cell planning and intercell interference reduction based on associating a cell with a specific polarization mode configuration. These issues are discussed in more detail below.

FIG. 4A shows a high-level view of an exemplary satellite radio access network (RAN), which is also referred to as a non-terrestrial network (NTN) 400. The exemplary satellite RAN shown in FIG. 4A includes a space-borne platform, such as a satellite 430, and an earth gateway 450 that connects the satellite to a base station 460. The radio link between the gateway and the satellite is referred to as a "feeder link" (440), while the radio link between the satellite and a particular device (e.g., UE 410) is referred to as an "access link" (420).

Depending on the orbit altitude, a satellite may be categorized as low earth orbit (LEO), medium earth orbit (MEO), or geostationary earth orbit (GEO). LEO satellites typically have orbital heights of 250-1,500 km (e.g., above earth sea level) and orbital periods of 90-120 minutes. MEO satellites typically have orbital heights of 5,000-25,000 km and orbital periods of 3-15 hours. GEO satellites have orbital heights of approximately 35,786 km and orbital periods of approximately 24 hours. In general, orbital period increases with orbital height.

Due to these significant orbital heights, satellite systems have path losses that can be significantly greater than in terrestrial networks. To overcome the high pathloss, the access and feeder links may need to operate in line of sight (LOS) conditions. As such, the NTN radio channels for the access and feeder links may therefore be dominated by a LOS component with few reflective (or non-LOS) components. One consequence is that a signal received on the earth will have generally the same polarization as the signal transmitted by the satellite, which is typically circularly polarized. As such, it is possible to achieve orthogonality between two signals transmitted by a satellite by choosing orthogonal polarizations, e.g., right-hand circular polarization (RHCP) and left-hand circular polarization (LHCP). This is generally not possible in terrestrial networks, where non-LOS components having different polarizations (e.g., due to various reflections) dominate the received signal.

A communication satellite typically generates several beams over a given area. The footprint of a beam (also referred to as "spotbeam") is usually an elliptic shape, which has been traditionally considered as a cell. A spotbeam may move over the earth surface with the satellite movement or may be earth-fixed with some beam pointing mechanism used by the satellite to compensate for its motion. The size of a spotbeam depends on the system design and may range from tens of kilometers to a few thousands of kilometers.

Relative to beams observed in a terrestrial network, the NTN beams (e.g., spotbeams 1-4 in FIG. 4A) can be very wide and extend beyond the area defined by a served cell. As such, beams covering adjacent cells can overlap, causing significant levels of intercell interference. To overcome this interference, different cells (e.g., different spotbeams) can be configured with different carrier frequencies and polarization modes. FIG. 4B shows an exemplary polarization arrangement for the spotbeams shown in FIG. 4A.

In LTE and NR, the UE reference point for the transmission of physical signals and channels is referred to as an "antenna port." This is an abstract concept specified by 3GPP, partly intended to relate a radio channel over which a first signal is transmitted to a radio channel over which a second signal is transmitted. The 3GPP specifications do not disclose how signals defined at a certain antenna port are mapped to a physical antenna connector, which is the input to the radiating antenna elements.

FIG. 5 illustrates an exemplary mapping between antenna ports, antenna connectors, and antennas. The physical channel is transmitted from the two antenna ports numbered as P0 and P1. In the exemplary arrangement shown in FIG. 5, the antenna ports are mapped to the two antenna connectors, each connected to a cross-polarized patch antenna. In general, both the antenna configuration and the antenna port-to-antenna mapping are implementation specific. With the proper mapping, however, UEs can support one or more polarization modes at any given time with different elements. More specifically, with the proper mapping, a UE can configure its antenna elements to form one or more "panels," each of which can transmit and/or receive signals with a particular polarization.

Even so, the advanced beam management functionally specified in LTE and NR does not support UE configuration of transmit and receive beams to a well-defined polarization mode. This is a consequence of allowing the antenna port-to-antenna connector mapping and the antenna configuration to be implementation-specific. As such, LTE and NR UEs are generally unprepared to support NTN cell planning and intercell interference reduction based on polarization.

For example, in an NTN, there may be UEs with different antenna types. Some UEs may be equipped with linearly polarized antennas, while some other UEs may be equipped with circularly polarized antennas. On the other hand, satellite transmitters typically use circular polarization. However, a UE (such as the device shown in FIG. 4A) that is unaware that a particular satellite (or cell/spotbeam) is associated with a specific polarization mode will not adapt its receiver accordingly. If there is a mismatch in polarization between the UE's receiver and the satellite transmitter, the UE will experience downlink signal loss and performance degradation. For example, this can prevent a UE from detecting and/or acquiring an otherwise-suitable cell, resulting in the UE camping and connecting to non-optimal and/or non-preferred cells. Similarly, a mismatch in polarization between the UE's transmitter and the satellite receiver will degrade uplink performance and cause unwanted interference to neighboring cells.

Accordingly, exemplary embodiments of the present disclosure provide techniques for configuring and signalling transmit and receive polarization modes configured in a UE operating in an NTN. Such embodiments provide various benefits and/or advantages. In general, such embodiments provide ways to efficiently handle associations between cells and polarization modes in an NTN. As a more specific example, such embodiments facilitate spectrally efficient performance of downlink and uplink between a satellite and a UE. As another example, such embodiments enable accurate measurement of signal strength and/or quality by UEs under dominate LOS conditions, thereby facilitating correct and efficient management of UE mobility both in RRC_CONNECTED and RRC_IDLE states.

In some embodiments, a new UE type can be introduced in the 3GPP specifications. This new UE type can be required to support transmitter and receiver beams supporting one or more polarization modes, including linear polarization (e.g., vertical, horizontal) and/or circular polarization modes (e.g., RHCP, LHCP).

In other embodiments, a new UE capability can be introduced in the 3GPP specifications. This new UE capability—which is not mandated—indicates support for transmitter and receiver beams supporting one or more polarization modes, such as those mentioned above.

In some embodiments, a new UE capability can be introduced, in the 3GPP specifications, that indicates the number of antenna panels the UE can support and the corresponding polarization modes for those supported panels. For example, the UE may support a UE capability of two panels with the first panel having LHCP and the second panel having RHCP.

In some embodiments, a new UE capability can be introduced, in the 3GPP specifications, that indicates support for polarization correspondence. For example, a UE supporting polarization correspondence can transmit a signal (e.g., in the uplink) using the same polarization mode as a received reference signal that was transmitted by the network (e.g., in the downlink). The polarization mode of the signal received by the UE can be indicated explicitly or implicitly by the network (e.g., by signaling), or the UE may detect it autonomously by performing multiple hypothesis testing of polarization modes for a given received signal and selecting a particular polarization mode based on a metric (e.g., signal to noise ratio).

In some embodiments, the UE can send to the network an indication of its polarization capabilities. For example, this indication can relate to the UE's type, supported polarization modes, supported polarization correspondence, and/or a list of supported antenna panels and their associated polarization modes. The reported polarization modes may be limited to a subset of all available polarization modes In one example, a UE can indicate its polarization capabilities through the 3GPP UE capability reporting procedure. As another example, a UE can report any of this information during a random-access procedure, e.g., via msg1 and/or msg3.

In some embodiments, the UE can indicate that its polarization correspondence capability is restricted to some subset of available polarization modes. For example, the UE can indicate that it can follow the polarization mode of the DL signal in its UL transmission, as long as it is a circularly polarized mode (e.g., RHCP or LHCP).

In some embodiments, the network node can receive, from the UE, an indication of the UE's polarization capabilities. In response, the network node can adapt its own receive and transmit polarization modes accordingly when communicating with, and/or measuring signals transmitted by, a UE that utilizes the indicated polarization capabilities.

In some embodiments, the network can control radio resources for the UE based on the UE's indicated polarization capabilities. In other words, the network can control radio resources differently for UEs that indicate different polarization capabilities, such as different types, different supported polarization modes, different supported polarization correspondence, and/or different numbers of antenna panels and associated polarization modes.

For example, based on the UE's indicated polarization capabilities, the network can configure radio resource parameters such as aggregation factor, modulation and coding scheme (MCS) table, time domain resource allocation (TDRA) table, frequency resource allocation (e.g., type 0 and/or 1), block error rate (BER) target, PRB bundling configuration, PDSCH mapping (e.g., type A and/or B), PUSCH transmission schemes (e.g., codebook and/or non-codebook based), HARQ process configuration (e.g., enabled/disabled), etc.

In some embodiments, a network can control the mobility of a UE to a different cell, and/or to select a secondary cell for dual connectivity with the UE, based on the polarization capabilities indicated by the UE. Controlling the mobility can including handing over the UE to a different cell, including providing the UE with information about the capabilities of the cell. For example, if the UE indicates support for a particular polarization mode (e.g., LHCP), the network node can select a cell (or spotbeam) supporting the indicated polarization mode for handing over the UE, or as a secondary cell for the UE.

In some cases, a network node may communicate with a UE supporting multiple polarization modes using multiple beams, e.g., one configured for RHCP and one for LHCP. In one example, the UE may be in an overlapping region between two spotbeams where the UE could experience similar signal strength in the two spot beams. Considering the example illustrated by FIGS. 4A-B, a UE can be near the overlapping region of spotbeams 1 and 2, which are both on carrier frequency FA but on different polarization modes (e.g., PA in spotbeam 1, PB in spotbeam 2). In this scenario, the UE can benefit from receiving PDSCH concurrently from both spotbeams 1 and 2. For example, this can enable the UE to receive two layers of data, with one scheduled on each PDSCH. To facilitate this capability, a UE can be equipped with two antenna panels, with one being arranged to receive PA (e.g., from spotbeam 1) and the other being arranged to receive PB (e.g., from spotbeam 2).

The supported antenna polarization in a network node (e.g., satellite, gateway, base station) may be different from the supported antenna polarization in a UE type or by an individual UE. The network node can take various actions in response to this condition.

In some embodiments, if a UE does not support polarization correspondence and/or the polarization mode(s) used by the network to serve a cell, the UE is not permitted to establish a connection in the cell. This restriction may be configured by the network via broadcast signaling. For example, the network can broadcast the polarization mode(s) supported in a cell, along with one or more rules for restricting random access in the cell to UEs supporting the broadcast polarization modes. Such rules can also be pre-configured in the UEs.

In other embodiments, an access restriction based on polarization mode support can be configured via dedicated signaling during establishment of a UE connection in the cell. Such an access restriction mechanism can be configured per UE and can apply to one or more cells, e.g., a single cell, all cells in a tracking area, all cells in a PLMN, etc. Such an access restriction can be valid for a configured duration, until removed, or indefinitely.

In some embodiments, a network can bar UEs (e.g., of a particular type or capability) that do not support polarization correspondence or polarization modes indicated by the network (e.g., broadcast as system information in a cell) from accessing a cell. This barring can apply to all UEs of a particular type, and/or to all UEs lacking a particular capability. Such an access restriction can apply to one or more cells, e.g., a single cell, all cells in a tracking area, all cells in a PLMN, etc. Such an access restriction can be valid for a configured duration, until removed, or indefinitely.

In some embodiments, a network can configure a UE that indicates a particular polarization correspondence to transmit a random access response (and, optionally, subsequent transmissions) using the same polarization mode as an associated downlink signal such as an SSB or/and SIB1. This polarization configuration can be valid for a configured duration, until removed, or indefinitely.

Figure 6:
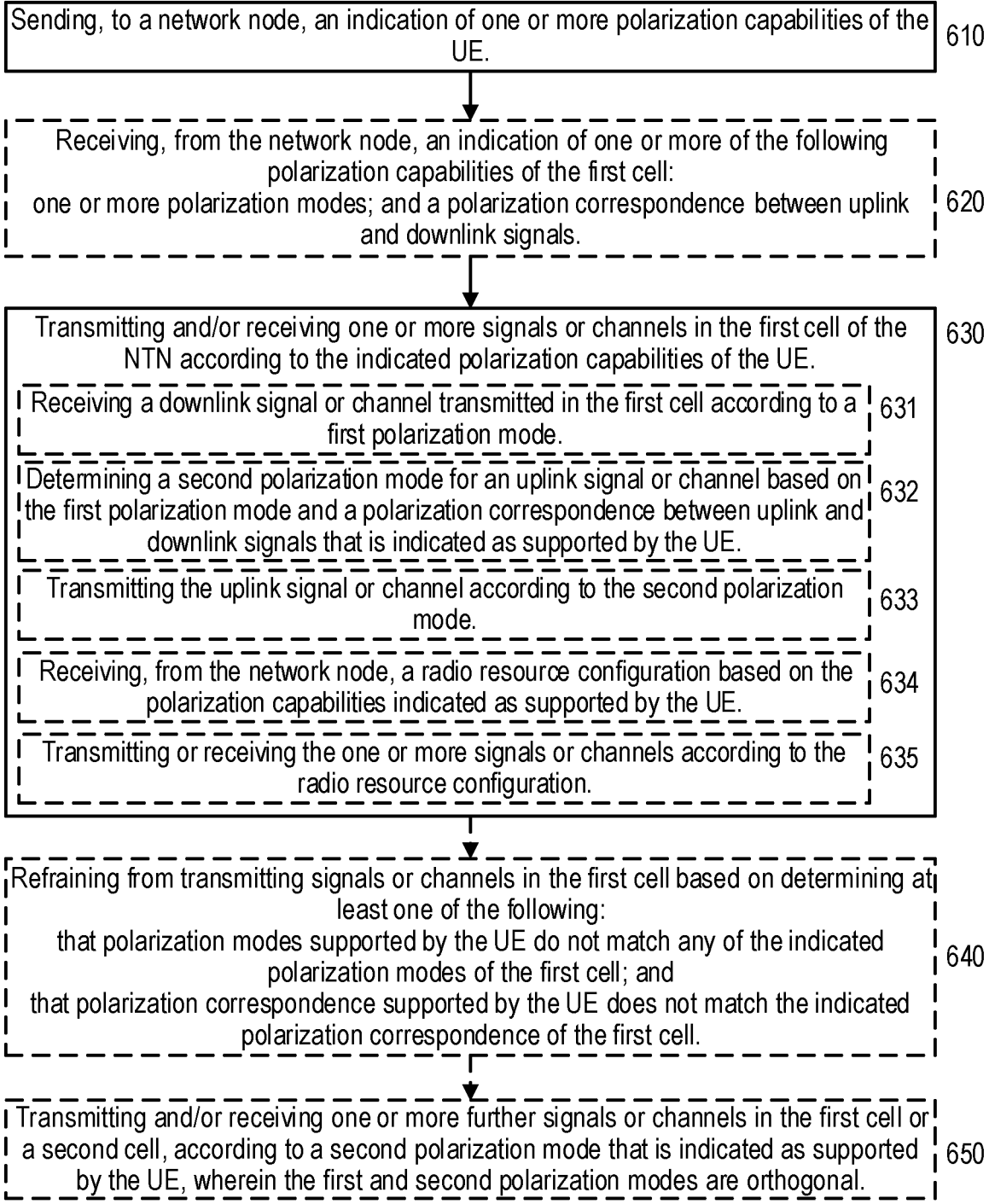
FIG. 6 illustrates an exemplary method (e.g., procedure) for a user equipment (UE, e.g., wireless device), according to various exemplary embodiments of the present disclosure.
Figure 7:
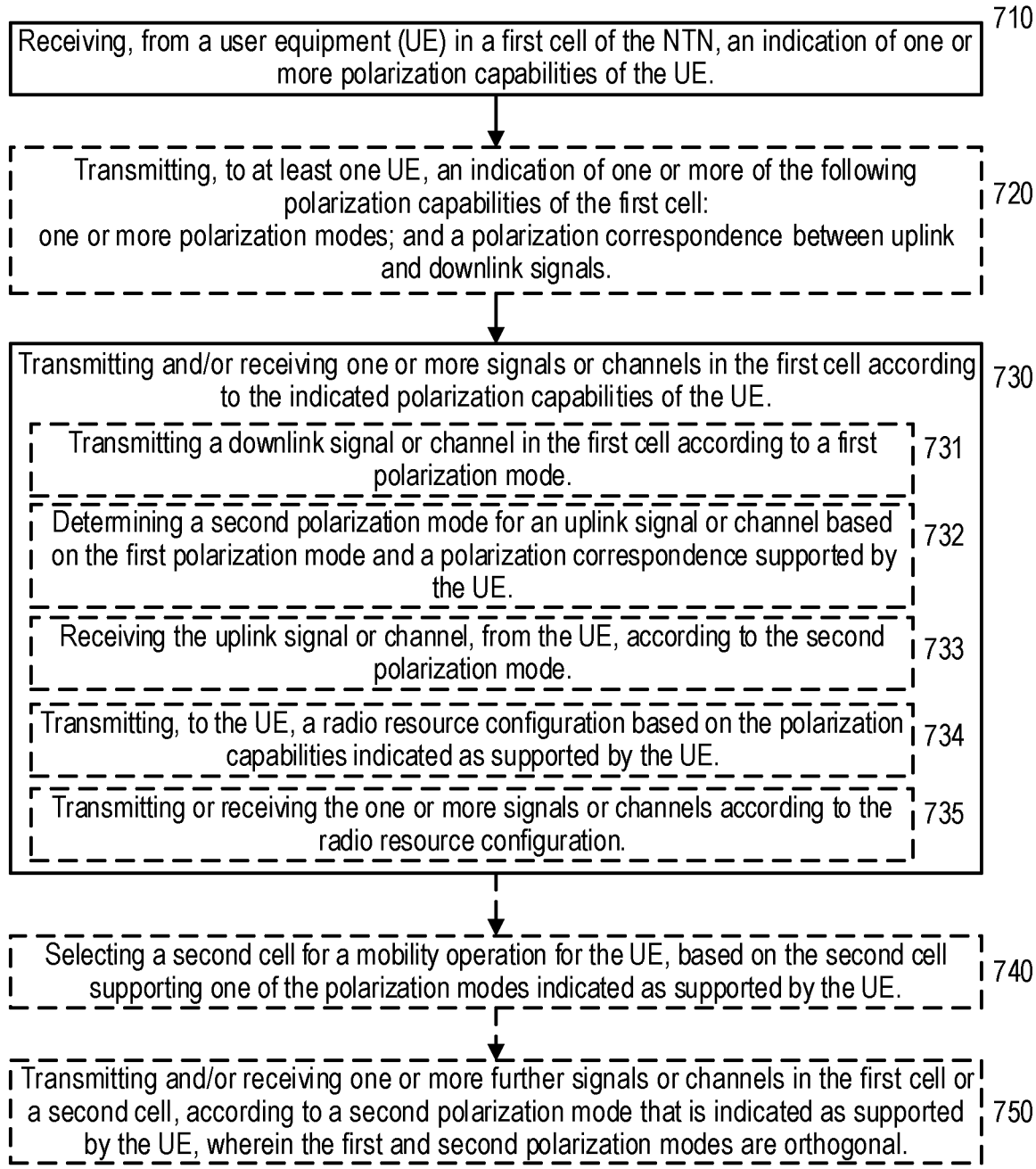
FIG. 7 illustrates an exemplary method (e.g., procedure) for a network node (e.g., satellite, gateway, base station, etc.) in an NTN, according to various exemplary embodiments of the present disclosure.

These embodiments described above can be further illustrated with reference to FIGS. 6-7, which depict exemplary methods (e.g., procedures) for a UE and a network node, respectively. In other words, various features of the operations described below with reference to FIGS. 6-7 correspond to various embodiments described above. Furthermore, the exemplary methods shown in FIGS. 6-7 can be used cooperatively to provide various benefits, advantages, and/or solutions described herein. Although FIGS. 6-7 shows specific blocks in particular orders, the operations of the exemplary methods can be performed in different orders than shown and can be combined and/or divided into blocks having different functionality than shown. Optional operations are indicated by dashed lines.

More specifically, FIG. 6 is a flow diagram illustrating an exemplary method (e.g., procedure) for operating a user equipment (UE) in a non-terrestrial network (NTN) that utilizes one or more polarization modes for serving one or more cells, according to various exemplary embodiments of the present disclosure. The exemplary method shown in FIG. 6 can be performed by a UE (e.g., wireless device), such as described in relation to other figures herein.

The exemplary method illustrated in FIG. 6 can include the operations of block 610, where the UE can send, to a network node, an indication of one or more polarization capabilities of the UE. The exemplary method can also include the operations of block 630, where the UE can transmit and/or receive one or more signals or channels in a first cell of the NTN according to the indicated polarization capabilities of the UE.

In various embodiments, the indicated polarization capabilities of the UE can include any of the following:
 a UE type (e.g., associated with mandatory support of such polarization capabilities);
 one or more polarization modes supported by the UE;
 a polarization correspondence between uplink and downlink signals that is supported by the UE; and
 a list of antenna panels supported by the UE and polarization modes supported by the respective antenna panels.

In some embodiments, the one or more polarization modes indicated as supported by the UE include any of the following: linear polarization, horizontal polarization, vertical polarization, circular polarization, right-hand circular polarization, and left-hand circular polarization.

In some embodiments, the exemplary method can also include the operations of block 620, where the UE can receive, from the network node, an indication of one or more of the following polarization capabilities of the first cell: one or more polarization modes; and a polarization correspondence between uplink and downlink signals. For example, to access the first cell, the UE may be required to support all or a subset of the indicated polarization capabilities of the first cell.

In some of these embodiments, the indicated polarization capabilities of the first cell comprise a UE access restriction to the first cell, and can be received (e.g., in block 620) according to one of the following:
 broadcast in the first cell (e.g., in the master information block, MIB, or in a system information block, SIB); or
 as a dedicated message to the UE in response to the indication of the one or more polarization capabilities of the UE (e.g., sent in block 610).

In some of these embodiments, the indicated polarization capabilities of the UE are a subset of the indicated polarization capabilities of the first cell. For example, the UE can select the subset from the polarization capabilities of the first cell that were received via broadcast.

In some of these embodiments, the exemplary method can also include the operations of block 640, where the UE can refrain from transmitting signals or channels in the first cell based on determining at least one of the following:

that polarization modes supported by the UE do not match any of the indicated polarization modes of the first cell; and that polarization correspondence supported by the UE does not match the indicated polarization correspondence of the first cell.

In some embodiments, the transmitting and/or receiving operations in block 630 can include the operations of sub-blocks 631-633. In sub-block 631, the UE can receive a downlink signal or channel in the first cell according to a first polarization mode. In sub-block 632, the UE can determine a second polarization mode for an uplink signal or channel based on the first polarization mode and between uplink and downlink signals that is indicated as supported by the UE (e.g., in block 620). In sub-block 633, the UE can transmit the uplink signal or channel in the first cell according to the second polarization mode.

In some of these embodiments, the downlink signal or channel can be one of the following: a primary synchronization signal, a secondary synchronization signal, and a broadcast control channel (BCCH). Likewise, the uplink signal or channel can be a random-access channel (RACH) or a Physical Uplink Shared Channel (PUSCH). In such embodiments, the second polarization mode can be the same as the first polarization mode.

In other embodiments, the transmitting and/or receiving operations in block 630 can include the operations of sub-blocks 634-635. In sub-block 634, the UE can receive, from the network node, a radio resource configuration based on the polarization capabilities indicated as supported by the UE. In sub-block 635, the UE can transmit and/or receive the one or more signals or channels according to the radio resource configuration. In various embodiments, the radio resource configuration can include any of the following: aggregation factor, modulation and coding scheme (MCS) table, time domain resource allocation (TDRA) table, frequency resource allocation, block error rate (BER) target, physical resource block (PRB) bundling configuration, physical downlink shared channel (PDSCH) mapping, physical uplink shared channel (PUSCH) transmission scheme, and hybrid ARQ (HARQ) process configuration.

In some embodiments, the one or more signals or channels can be transmitted and/or received in the first cell according to a first polarization mode indicated as supported by the UE. In such embodiments, the exemplary method can also include the operations of block 650, where the UE can transmit and/or receive one or more further signals or channels in the first cell or a second cell, according to a second polarization mode indicated as supported by the UE. The second polarization mode can be orthogonal to the first polarization mode. For example, the first polarization mode can be one of RHCP and LHCP, and the second polarization mode can be the other of RHCP and LHCP.

In some of these embodiments, the one or more signals or channels can include a first physical downlink channel (e.g., PDSCH, PDCCH) received in the first cell, and the one or more further signals or channels can include a second physical downlink channel (e.g., of the same type as the first) received in the first cell or in the second cell. In such embodiments, the first and second physical downlink channels can be received concurrently by the UE, thereby providing an increased data rate and/or increased reliability. Concurrent transmission of uplink physical channels (e.g., PUCCH, PUSCH) in this manner is also possible.

Likewise, in some of these embodiments, the one or more signals or channels can be transmitted and/or received using a first antenna panel supporting the first polarization mode, and the one or more further signals or channels can be transmitted and/or received using a second antenna panel supporting the second polarization mode.

In addition, FIG. 7 is a flow diagram illustrating an exemplary method (e.g., procedure) for operating a network node of a non-terrestrial network (NTN) that uses one or more polarization modes for serving one or more cells, according to various exemplary embodiments of the present disclosure. The exemplary method shown in FIG. 7 can be performed by a network node (e.g., satellite, gateway, base station, etc.), such as described in relation to other figures herein.

The exemplary method illustrated in FIG. 7 can include the operations of block 710, in which the network node can receive, from a user equipment (UE) in a first cell of the NTN, an indication of one or more polarization capabilities of the UE. The exemplary method can also include the operations of block 730, in which the network node can transmit and/or receive one or more signals or channels in the first cell according to the indicated polarization capabilities of the UE.

In various embodiments, the indicated polarization capabilities of the UE can include any of the following:

a UE type (e.g., associated with mandatory support of such polarization capabilities);

one or more polarization modes supported by the UE;

a polarization correspondence between uplink and downlink signals that is supported by the UE; and a list of antenna panels supported by the UE and polarization modes supported by the respective antenna panels.

In some embodiments, the one or more polarization modes indicated as supported by the UE include any of the following: linear polarization, horizontal polarization, vertical polarization, circular polarization, right-hand circular polarization, and left-hand circular polarization.

In some embodiments, the exemplary method can also include the operations of block 720, where the network node can transmit, to at least one UE, an indication of one or more of the following polarization capabilities of the first cell: one or more polarization modes; and a polarization correspondence between uplink and downlink signals. For example, to access the first cell, the UE may be required to support all or a subset of the indicated polarization capabilities of the first cell.

In some of these embodiments, the indicated polarization capabilities of the first cell comprise a UE access restriction to the first cell, and can be transmitted (e.g., in block 720) according to one of the following:

broadcast in the first cell (e.g., in the MIB or a SIB); or as a dedicated message to the UE in response to the indication of the one or more polarization capabilities of the UE (e.g., received in block 710).

In some of these embodiments, the indicated polarization capabilities of the UE are a subset of the indicated polarization capabilities of the first cell. For example, the UE can select the subset from the polarization capabilities of the first cell that that the UE received via broadcast.

In some embodiments, the exemplary method can also include the operations of block 740, where the network node can select a second cell for a mobility operation for the UE, based on the second cell supporting one of the polarization modes indicated as supported by the UE (e.g., as received in block 710).

In some embodiments, the transmitting and/or receiving operations in block 730 can include the operations of sub-blocks 731-733. In sub-block 731, the network node can transmit a downlink signal or channel in the first cell according to a first polarization mode. In sub-block 732, the network node can determine a second polarization mode for an uplink signal or channel based on the first polarization mode and a polarization correspondence between uplink and downlink signals that is indicated as supported by the UE. In sub-block 733, the network node can receive the uplink signal or channel in the first cell according to the second polarization mode.

In some of these embodiments, the downlink signal or channel can be one of the following: a primary synchronization signal, a secondary synchronization signal, and a broadcast control channel (BCCH). Likewise, the uplink signal or channel can be a random-access channel (RACH) or a Physical Uplink Shared Channel (PUSCH). In such embodiments, the second polarization mode can be the same as the first polarization mode.

In other embodiments, the transmitting and/or receiving operations in block 730 can include the operations of sub-blocks 734-735. In sub-block 734, the network node can transmit, to the UE, a radio resource configuration based on the polarization capabilities indicated as supported by the UE (e.g., as received in block 710). In sub-block 735, the network node can transmit and/or receive the one or more signals or channels in the first cell according to the radio resource configuration. In various embodiments, the radio resource configuration can include any of the following: aggregation factor, modulation and coding scheme (MCS) table, time domain resource allocation (TDRA) table, frequency resource allocation, block error rate (BER) target, physical resource block (PRB) bundling configuration, physical downlink shared channel (PDSCH) mapping, physical uplink shared channel (PUSCH) transmission scheme, and hybrid ARQ (HARD) process configuration.

In some embodiments, the one or more signals or channels can be transmitted and/or received (i.e., by the network node) in the first cell according to a first polarization mode that is indicated as supported by the UE (e.g., in block 710). In such embodiments, the exemplary method can also include the operations of block 750, where the network node can transmit and/or receive one or more further signals or channels in the first cell or a second cell, according to a second polarization mode that is indicated as supported by the UE. The second polarization mode can be orthogonal to the first polarization mode. For example, the first polarization mode can be one of RHCP and LHCP, and the second polarization mode can be the other of RHCP and LHCP.

In some of these embodiments, the one or more signals or channels can include a first physical downlink channel (e.g., PDSCH, PDCCH) transmitted in the first cell, and the one or more further signals or channels can include a second physical downlink channel (e.g., of the same type as the first) transmitted in the first cell or in the second cell. In such embodiments, the first and second physical downlink channels can be transmitted concurrently, thereby providing an increased data rate and/or increased reliability. Concurrent reception of uplink physical channels (e.g., PUCCH, PUSCH) in this manner is also possible.

Figure 8:
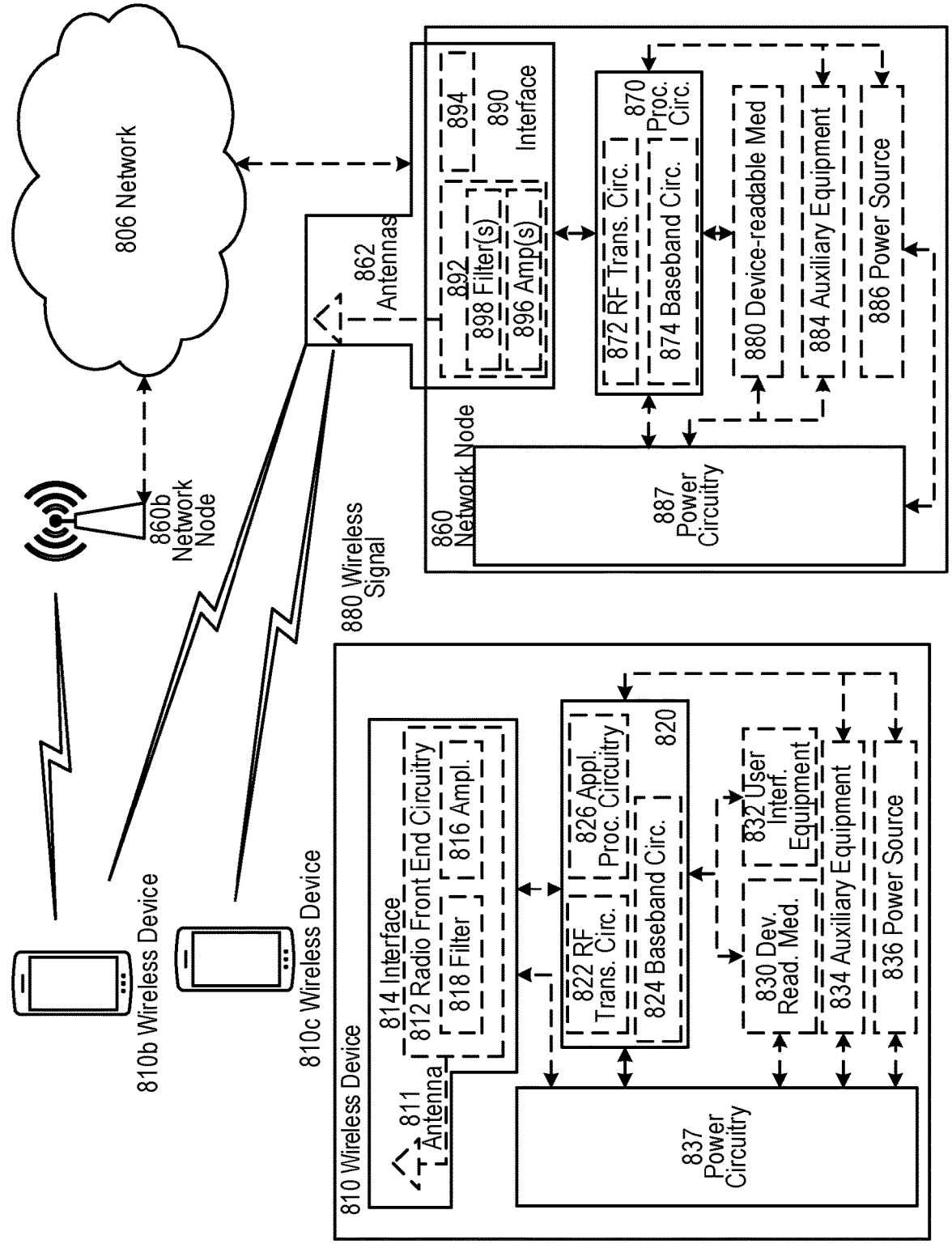
FIG. 8 illustrates an exemplary embodiment of a wireless network, in accordance with various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network can further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 860 are depicted as single boxes located within a larger box, or nested within multiple boxes, in practice, a network node can comprise multiple different physical components that make up a single illustrated component (e.g., device readable medium 880 can comprise multiple separate hard drives as well as multiple RAM modules).

Similarly, network node 860 can be composed of multiple physically separate components (e.g., a NodeB component and an RNC component, or a BTS component and a BSC component, etc.), which can each have their own respective components. In certain scenarios in which network node 860 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 860 can be configured to support multiple radio access technologies (RATs). In such embodiments, some components can be duplicated (e.g., separate device readable medium 880 for the different RATs) and some components can be reused (e.g., the same antenna 862 can be shared by the RATs). Network node 860 can also include multiple sets of the various illustrated components for different wireless technologies integrated into network node 860, such as, for example, GSM, WCDMA, LTE, NR, WiFi, or Bluetooth wireless technologies. These wireless technologies can be integrated into the same or different chip or set of chips and other components within network node 860.

Processing circuitry 870 can be configured to perform any determining, calculating, or similar operations (e.g., certain obtaining operations) described herein as being provided by a network node. These operations performed by processing circuitry 870 can include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 860, either alone or in conjunction with other network node 860 components (e.g., device readable medium 880). Such functionality can include any of the various wireless features, functions, or benefits discussed herein.

For example, processing circuitry 870 can execute instructions stored in device readable medium 880 or in memory within processing circuitry 870. In some embodiments, processing circuitry 870 can include a system on a chip (SOC). As a more specific example, instructions (also referred to as a computer program product) stored in medium 880 can include instructions that, when executed by processing circuitry 870, can configure network node 860 to perform operations corresponding to various exemplary methods (e.g., procedures) described herein.

In some embodiments, processing circuitry 870 can include one or more of radio frequency (RF) transceiver circuitry 872 and baseband processing circuitry 874. In some embodiments, radio frequency (RF) transceiver circuitry 872 and baseband processing circuitry 874 can be on separate chips (or sets of chips), boards, or units, such as radio units and digital units. In alternative embodiments, part or all of RF transceiver circuitry 872 and baseband processing circuitry 874 can be on the same chip or set of chips, boards, or units In certain embodiments, some or all of the functionality described herein as being provided by a network node, base station, eNB or other such network device can be performed by processing circuitry 870 executing instructions stored on device readable medium 880 or memory within processing circuitry 870. In alternative embodiments, some or all of the functionality can be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 870. Device readable medium 880 can store any suitable instructions, data or information, including a computer program, software, an application including one or more of logic, rules, code, tables, etc. and/or other instructions capable of being executed by processing circuitry 870 and, utilized by network node 860. Device readable medium 880 can be used to store any calculations made by processing circuitry 870 and/or any data received via interface 890. In some embodiments, processing circuitry 870 and device readable medium 880 can be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that can be coupled to, or in certain embodiments a part of, antenna 862. Radio front end circuitry 892 comprises filters 898 and amplifiers 896. Radio front end circuitry 892 can be connected to antenna 862 and processing circuitry 870. Radio front end circuitry can be configured to condition signals communicated between antenna 862 and processing circuitry 870. Radio front end circuitry 892 can receive digital data that is to be sent out to other network nodes or WDs via a wireless connection. Radio front end circuitry 892 can convert the digital data into a radio signal having the appropriate channel and bandwidth parameters using a combination of filters 898 and/or amplifiers 896. The radio signal can then be transmitted via antenna 862. Similarly, when receiving data, antenna 862 can collect radio signals which are then converted into digital data by radio front end circuitry 892. The digital data can be passed to processing circuitry 870. In other embodiments, the interface can comprise different components and/or different combinations of components.

In certain alternative embodiments, network node 860 may not include separate radio front end circuitry 892, instead, processing circuitry 870 can comprise radio front end circuitry and can be connected to antenna 862 without separate radio front end circuitry 892. Similarly, in some embodiments, all or some of RF transceiver circuitry 872 can be considered a part of interface 890. In still other embodiments, interface 890 can include one or more ports or terminals 894, radio front end circuitry 892, and RF transceiver circuitry 872, as part of a radio unit (not shown), and interface 890 can communicate with baseband processing circuitry 874, which is part of a digital unit (not shown).

Antenna 862 can include one or more antennas, or antenna arrays, configured to send and/or receive wireless signals. Antenna 862 can be coupled to radio front end circuitry 890 and can be any type of antenna capable of transmitting and receiving data and/or signals wirelessly. In some embodiments, antenna 862 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 862 can be separate from network node 860 and can be connectable to network node 860 through an interface or port.

Antenna 862, interface 890, and/or processing circuitry 870 can be configured to perform any receiving operations and/or certain obtaining operations described herein as being performed by a network node. Any information, data and/or signals can be received from a wireless device, another network node and/or any other network equipment. Similarly, antenna 862, interface 890, and/or processing circuitry 870 can be configured to perform any transmitting operations described herein as being performed by a network node. Any information, data and/or signals can be transmitted to a wireless device, another network node and/or any other network equipment.

Power circuitry 887 can comprise, or be coupled to, power management circuitry and can be configured to supply the components of network node 860 with power for performing the functionality described herein. Power circuitry 887 can receive power from power source 886. Power source 886 and/or power circuitry 887 can be configured to provide power to the various components of network node 860 in a form suitable for the respective components (e.g., at a voltage and current level needed for each respective component). Power source 886 can either be included in, or external to, power circuitry 887 and/or network node 860. For example, network node 860 can be connectable to an external power source (e.g., an electricity outlet) via an input circuitry or interface such as an electrical cable, whereby the external power source supplies power to power circuitry 887. As a further example, power source 886 can comprise a source of power in the form of a battery or battery pack which is connected to, or integrated in, power circuitry 887. The battery can provide backup power should the external power source fail. Other types of power sources, such as photovoltaic devices, can also be used.

Alternative embodiments of network node 860 can include additional components beyond those shown in FIG. 8 that can be responsible for providing certain aspects of the network node's functionality, including any of the functionality described herein and/or any functionality necessary to support the subject matter described herein. For example, network node 860 can include user interface equipment to allow and/or facilitate input of information into network node 860 and to allow and/or facilitate output of information from network node 860. This can allow and/or facilitate a user to perform diagnostic, maintenance, repair, and other administrative functions for network node 860.

In some embodiments, a wireless device (WD, e.g., WD 810) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 can include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies can be integrated into the same or different chips or set of chips as other components within WD 810.

Antenna 811 can include one or more antennas or antenna arrays, configured to send and/or receive wireless signals, and is connected to interface 814. In certain alternative embodiments, antenna 811 can be separate from WD 810 and be connectable to WD 810 through an interface or port. Antenna 811, interface 814, and/or processing circuitry 820 can be configured to perform any receiving or transmitting operations described herein as being performed by a WD. Any information, data and/or signals can be received from a network node and/or another WD. In some embodiments, radio front end circuitry and/or antenna 811 can be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820 and can be configured to condition signals communicated between antenna 811 and processing circuitry 820. Radio front end circuitry 812 can be coupled to or a part of antenna 811. In some embodiments, WD 810 may not include separate radio front end circuitry 812; rather, processing circuitry 820 can comprise radio front end circuitry and can be connected to antenna 811. Similarly, in some embodiments, some or all of RF transceiver circuitry 822 can be considered a part of interface 814. Radio front end circuitry 812 can receive digital data that is to be sent out to other network nodes or WDs via a wireless connection. Radio front end circuitry 812 can convert the digital data into a radio signal having the appropriate channel and bandwidth parameters using a combination of filters 818 and/or amplifiers 816. The radio signal can then be transmitted via antenna 811. Similarly, when receiving data, antenna 811 can collect radio signals which are then converted into digital data by radio front end circuitry 812. The digital data can be passed to processing circuitry 820. In other embodiments, the interface can comprise different components and/or different combinations of components.

Processing circuitry 820 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 810 functionality either alone or in combination with other WD 810 components, such as device readable medium 830. Such functionality can include any of the various wireless features or benefits discussed herein.

For example, processing circuitry 820 can execute instructions stored in device readable medium 830 or in memory within processing circuitry 820 to provide the functionality disclosed herein. More specifically, instructions (also referred to as a computer program product) stored in medium 830 can include instructions that, when executed by processor 820, can configure wireless device 810 to perform operations corresponding to various exemplary methods (e.g., procedures) described herein.

As illustrated, processing circuitry 820 includes one or more of RF transceiver circuitry 822, baseband processing circuitry 824, and application processing circuitry 826. In other embodiments, the processing circuitry can comprise different components and/or different combinations of components. In certain embodiments processing circuitry 820 of WD 810 can comprise a SOC. In some embodiments, RF transceiver circuitry 822, baseband processing circuitry 824, and application processing circuitry 826 can be on separate chips or sets of chips. In alternative embodiments, part or all of baseband processing circuitry 824 and application processing circuitry 826 can be combined into one chip or set of chips, and RF transceiver circuitry 822 can be on a separate chip or set of chips. In still alternative embodiments, part or all of RF transceiver circuitry 822 and baseband processing circuitry 824 can be on the same chip or set of chips, and application processing circuitry 826 can be on a separate chip or set of chips. In yet other alternative embodiments, part or all of RF transceiver circuitry 822, baseband processing circuitry 824, and application processing circuitry 826 can be combined in the same chip or set of chips. In some embodiments, RF transceiver circuitry 822 can be a part of interface 814. RF transceiver circuitry 822 can condition RF signals for processing circuitry 820.

In certain embodiments, some or all of the functionality described herein as being performed by a WD can be provided by processing circuitry 820 executing instructions stored on device readable medium 830, which in certain embodiments can be a computer-readable storage medium. In alternative embodiments, some or all of the functionality can be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 can be configured to perform any determining, calculating, or similar operations (e.g., certain obtaining operations) described herein as being performed by a WD. These operations, as performed by processing circuitry 820, can include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 can be operable to store a computer program, software, an application including one or more of logic, rules, code, tables, etc. and/or other instructions capable of being executed by processing circuitry 820. Device readable medium 830 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 820. In some embodiments, processing circuitry 820 and device readable medium 830 can be considered to be integrated.

User interface equipment 832 can include components that allow and/or facilitate a human user to interact with WD 810. Such interaction can be of many forms, such as visual, audial, tactile, etc. User interface equipment 832 can be operable to produce output to the user and to allow and/or facilitate the user to provide input to WD 810. The type of interaction can vary depending on the type of user interface equipment 832 installed in WD 810. For example, if WD 810 is a smart phone, the interaction can be via a touch screen; if WD 810 is a smart meter, the interaction can be through a screen that provides usage (e.g., the number of gallons used) or a speaker that provides an audible alert (e.g., if smoke is detected). User interface equipment 832 can include input interfaces, devices and circuits, and output interfaces, devices and circuits. User interface equipment 832 can be configured to allow and/or facilitate input of information into WD 810 and is connected to processing circuitry 820 to allow and/or facilitate processing circuitry 820 to process the input information. User interface equipment 832 can include, for example, a microphone, a proximity or other sensor, keys/buttons, a touch display, one or more cameras, a USB port, or other input circuitry. User interface equipment 832 is also configured to allow and/or facilitate output of information from WD 810, and to allow and/or facilitate processing circuitry 820 to output information from WD 810. User interface equipment 832 can include, for example, a speaker, a display, vibrating circuitry, a USB port, a headphone interface, or other output circuitry. Using one or more input and output interfaces, devices, and circuits, of user interface equipment 832, WD 810 can communicate with end users and/or the wireless network and allow and/or facilitate them to benefit from the functionality described herein.

Auxiliary equipment 834 is operable to provide more specific functionality which may not be generally performed by WDs. This can comprise specialized sensors for doing measurements for various purposes, interfaces for additional types of communication such as wired communications etc. The inclusion and type of components of auxiliary equipment 834 can vary depending on the embodiment and/or scenario.

Power source 836 can, in some embodiments, be in the form of a battery or battery pack. Other types of power sources, such as an external power source (e.g., an electricity outlet), photovoltaic devices or power cells, can also be used. WD 810 can further comprise power circuitry 837 for delivering power from power source 836 to the various parts of WD 810 which need power from power source 836 to carry out any functionality described or indicated herein. Power circuitry 837 can in certain embodiments comprise power management circuitry. Power circuitry 837 can additionally or alternatively be operable to receive power from an external power source; in which case WD 810 can be connectable to the external power source (such as an electricity outlet) via input circuitry or an interface such as an electrical power cable. Power circuitry 837 can also in certain embodiments be operable to deliver power from an external power source to power source 836. This can be, for example, for the charging of power source 836. Power circuitry 837 can perform any converting or other modification to the power from power source 836 to make it suitable for supply to the respective components of WD 810.

Figure 9:
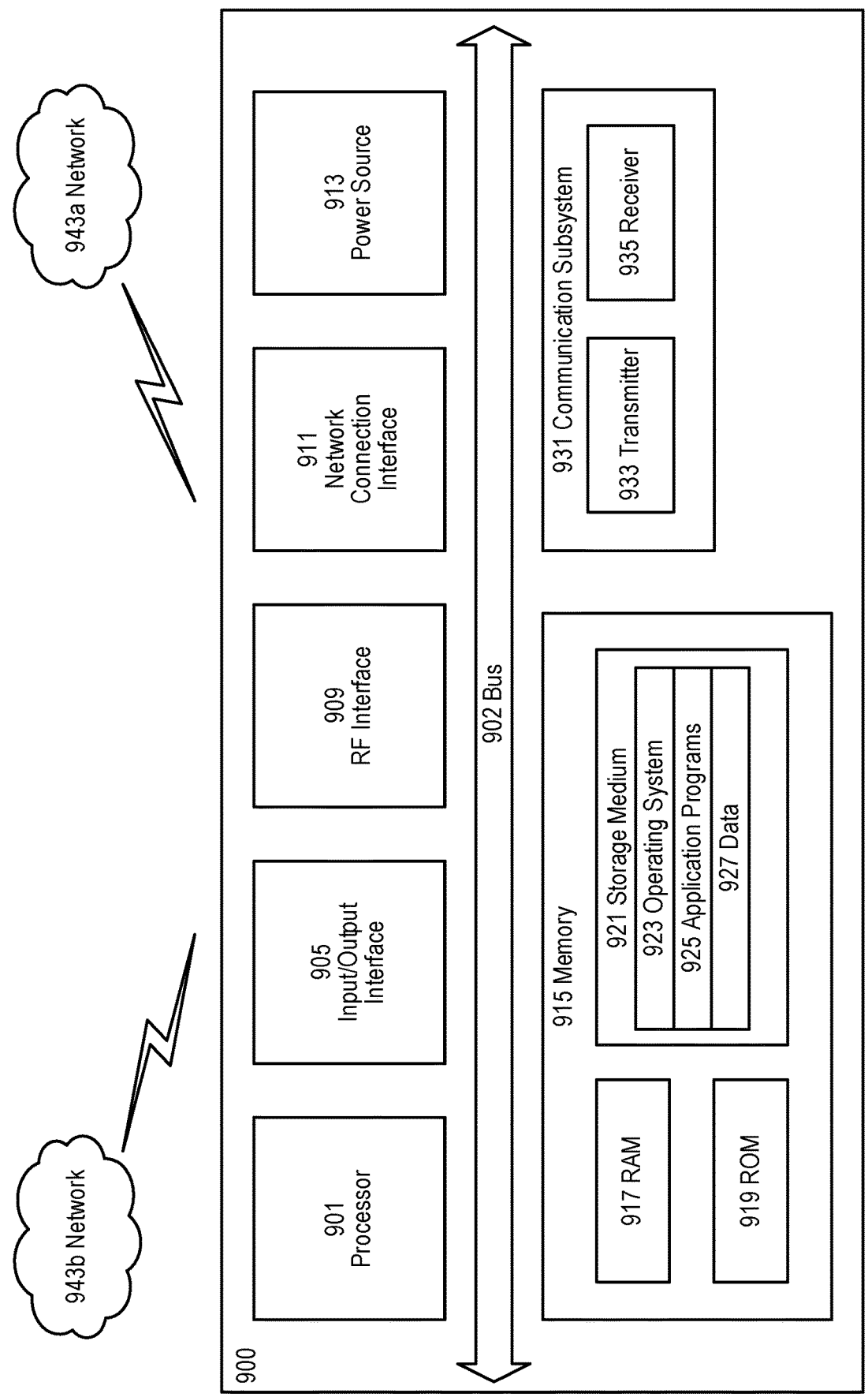
FIG. 9 illustrates an exemplary embodiment of a UE, in accordance with various exemplary embodiments of the present disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 900 can be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 can include other similar types of information. Certain UEs can utilize all of the components shown in FIG. 9, or only a subset of the components. The level of integration between the components can vary from one UE to another UE. Further, certain UEs can contain multiple instances of a component, such as multiple processors, memories, transceivers, transmitters, receivers, etc.

In FIG. 9, processing circuitry 901 can be configured to process computer instructions and data. Processing circuitry 901 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 can include two central processing units (CPUs). Data can be information in a form suitable for use by a computer.

In the depicted embodiment, input/output interface 905 can be configured to provide a communication interface to an input device, output device, or input and output device. UE 900 can be configured to use an output device via input/output interface 905. An output device can use the same type of interface port as an input device. For example, a USB port can be used to provide input to and output from UE 900. The output device can be a speaker, a sound card, a video card, a display, a monitor, a printer, an actuator, an emitter, a smartcard, another output device, or any combination thereof. UE 900 can be configured to use an input device via input/output interface 905 to allow and/or facilitate a user to capture information into UE 900. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 9, RF interface 909 can be configured to provide a communication interface to RF components such as a transmitter, a receiver, and an antenna. Network connection interface 911 can be configured to provide a communication interface to network 943a. Network 943a can encompass wired and/or wireless networks such as a local-area network (LAN), a wide-area network (WAN), a computer network, a wireless network, a telecommunications network, another like network or any combination thereof. For example, network 943a can comprise a Wi-Fi network. Network connection interface 911 can be configured to include a receiver and a transmitter interface used to communicate with one or more other devices over a communication network according to one or more communication protocols, such as Ethernet, TCP/IP, SONET, ATM, or the like. Network connection interface 911 can implement receiver and transmitter functionality appropriate to the communication network links (e.g., optical, electrical, and the like). The transmitter and receiver functions can share circuit components, software or firmware, or alternatively can be implemented separately.

RAM 917 can be configured to interface via bus 902 to processing circuitry 901 to provide storage or caching of data or computer instructions during the execution of software programs such as the operating system, application programs, and device drivers. ROM 919 can be configured to provide computer instructions or data to processing circuitry 901. For example, ROM 919 can be configured to store invariant low-level system code or data for basic system functions such as basic input and output (I/O), startup, or reception of keystrokes from a keyboard that are stored in a non-volatile memory. Storage medium 921 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 921 can be configured to include operating system 923; application program 925 such as a web browser application, a widget or gadget engine or another application; and data file 927. Storage medium 921 can store, for use by UE 900, any of a variety of various operating systems or combinations of operating systems. For example, application program 925 can include executable program instructions (also referred to as a computer program product) that, when executed by processor 901, can configure UE 900 to perform operations corresponding to various exemplary methods (e.g., procedures) described herein.

Storage medium 921 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 can allow and/or facilitate UE 900 to access computer-executable instructions, application programs or the like, stored on transitory or non-transitory memory media, to off-load data, or to upload data. An article of manufacture, such as one utilizing a communication system can be tangibly embodied in storage medium 921, which can comprise a device readable medium.

In FIG. 9, processing circuitry 901 can be configured to communicate with network 943b using communication subsystem 931. Network 943a and network 943b can be the same network or networks or different network or networks. Communication subsystem 931 can be configured to include one or more transceivers used to communicate with network 943b. For example, communication subsystem 931 can be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver can include transmitter 933 and/or receiver 935 to implement transmitter or receiver functionality, respectively, appropriate to the RAN links (e.g., frequency allocations and the like). Further, transmitter 933 and receiver 935 of each transceiver can share circuit components, software or firmware, or alternatively can be implemented separately.

In the illustrated embodiment, the communication functions of communication subsystem 931 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 can include cellular communication, Wi-Fi communication, Bluetooth communication, and GPS communication. Network 943b can encompass wired and/or wireless networks such as a local-area network (LAN), a wide-area network (WAN), a computer network, a wireless network, a telecommunications network, another like network or any combination thereof. For example, network 943b can be a cellular network, a Wi-Fi network, and/or a near-field network. Power source 913 can be configured to provide alternating current (AC) or direct current (DC) power to components of UE 900.

The features, benefits and/or functions described herein can be implemented in one of the components of UE 900 or partitioned across multiple components of UE 900. Further, the features, benefits, and/or functions described herein can be implemented in any combination of hardware, software or firmware. In one example, communication subsystem 931 can be configured to include any of the components described herein. Further, processing circuitry 901 can be configured to communicate with any of such components over bus 902. In another example, any of such components can be represented by program instructions stored in memory that when executed by processing circuitry 901 perform the corresponding functions described herein. In another example, the functionality of any of such components can be partitioned between processing circuitry 901 and communication subsystem 931. In another example, the non-computationally intensive functions of any of such components can be implemented in software or firmware and the computationally intensive functions can be implemented in hardware.

Figure 10:
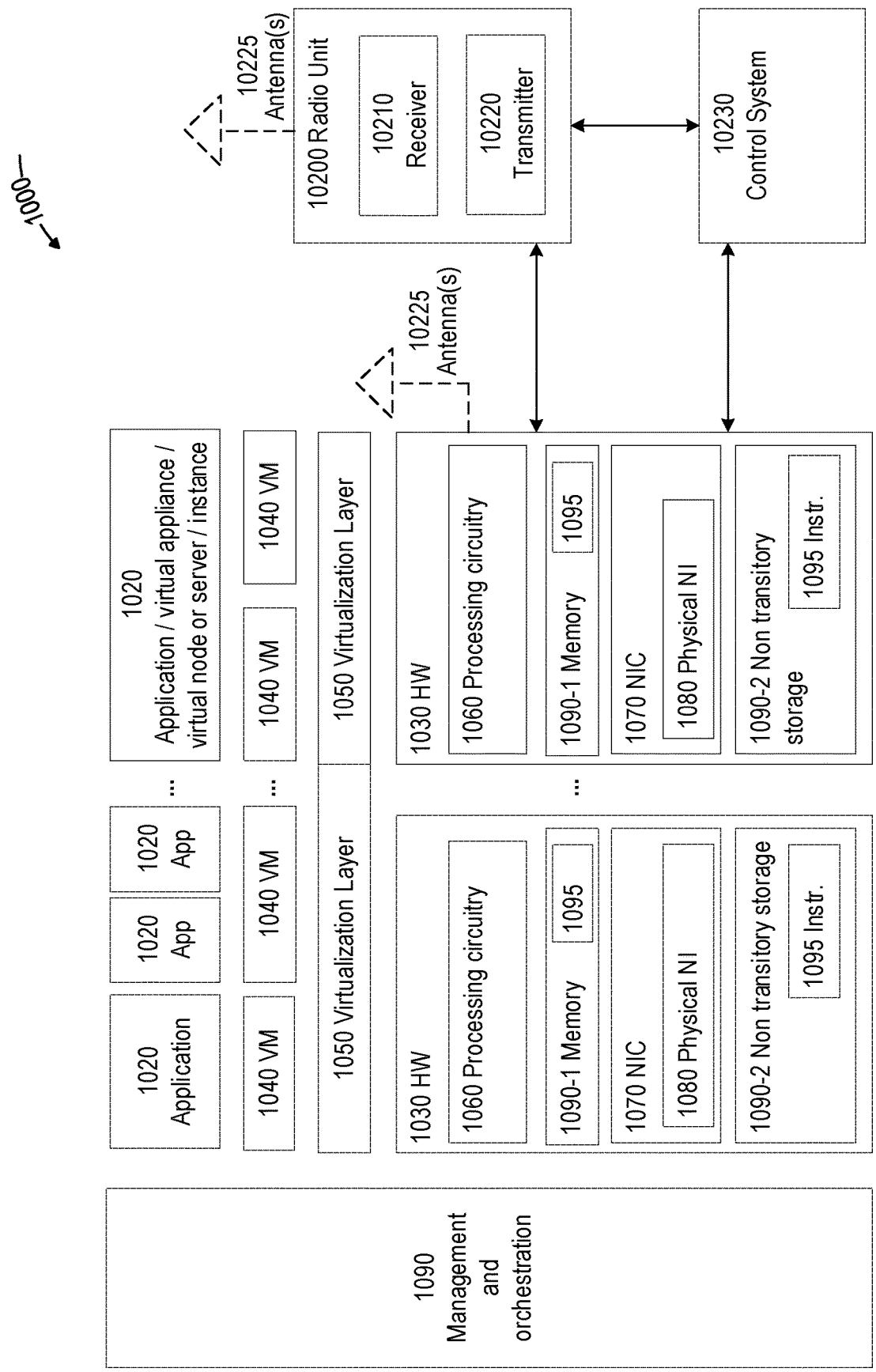
FIG. 10 is a block diagram illustrating an exemplary virtualization environment usable for implementation of various embodiments of network nodes described herein.

FIG. 10 is a schematic block diagram illustrating a virtualization environment 1000 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node can be entirely virtualized.

The functions can be implemented by one or more applications 1020 (which can alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000 can include general-purpose or special-purpose network hardware devices (or nodes) 1030 comprising a set of one or more processors or processing circuitry 1060, which can be commercial off-the-shelf (COTS) processors, dedicated Application Specific Integrated Circuits (ASICs), or any other type of processing circuitry including digital or analog hardware components or special purpose processors. Each hardware device can comprise memory 1090-1 which can be non-persistent memory for temporarily storing instructions 1095 or software executed by processing circuitry 1060. For example, instructions 1095 can include program instructions (also referred to as a computer program product) that, when executed by processing circuitry 1060, can configure hardware node 1020 to perform operations corresponding to various exemplary methods (e.g., procedures) described herein. Such operations can also be attributed to virtual node(s) 1020 that is/are hosted by hardware node 1030.

Each hardware device can comprise one or more network interface controllers (NICs) 1070, also known as network interface cards, which include physical network interface 1080. Each hardware device can also include non-transitory, persistent, machine-readable storage media 1090-2 having stored therein software 1095 and/or instructions executable by processing circuitry 1060. Software 1095 can include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and can be run by a corresponding virtualization layer 1050 or hypervisor. Different embodiments of the instance of virtual appliance 1020 can be implemented on one or more of virtual machines 1040, and the implementations can be made in different ways.

During operation, processing circuitry 1060 executes software 1095 to instantiate the hypervisor or virtualization layer 1050, which can sometimes be referred to as a virtual machine monitor (VMM). Virtualization layer 1050 can present a virtual operating platform that appears like networking hardware to virtual machine 1040.

As shown in FIG. 10, hardware 1030 can be a standalone network node with generic or specific components. Hardware 1030 can comprise antenna 10225 and can implement some functions via virtualization. Alternatively, hardware 1030 can be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1040 can be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 can be coupled to one or more antennas 10225. Radio units 10200 can communicate directly with hardware nodes 1030 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 10230, which can alternatively be used for communication between the hardware nodes 1030 and radio units 10200.

Figure 11:
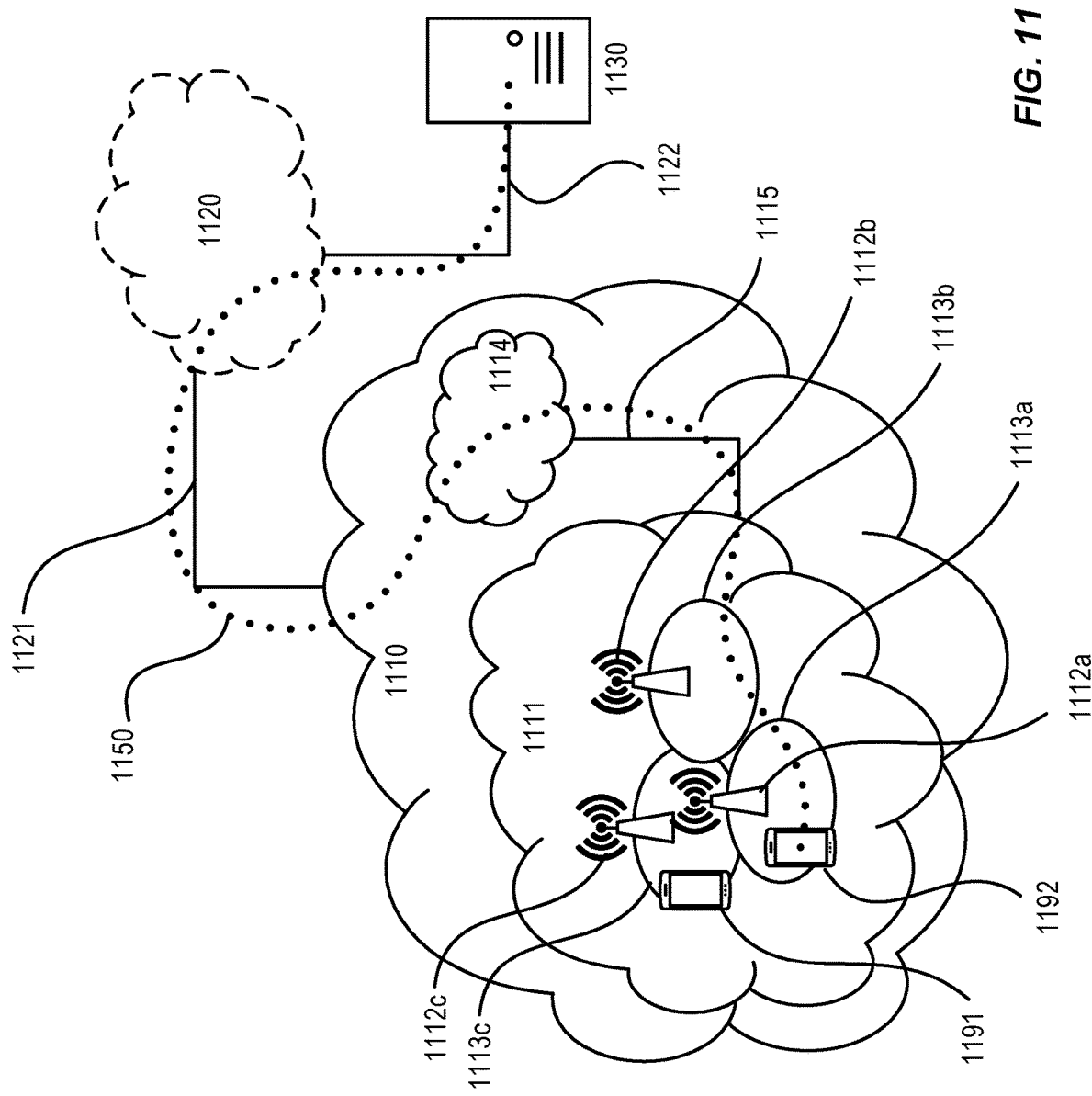
FIGS. 11-12 are block diagrams of exemplary communication systems configurable according to various exemplary embodiments of the present disclosure.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c can be configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the Telecommunication network 1110 is itself connected to host computer 1130, which can be embodied in the hardware and/or software of a standalone server, a cloud-implemented server, a distributed server or as processing resources in a server farm. Host computer 1130 can be under the ownership or control of a service provider or can be operated by the service provider or on behalf of the service provider. Connections 1121 and 1122 between telecommunication network 1110 and host computer 1130 can extend directly from core network 1114 to host computer 1130 or can go via an optional intermediate network 1120. Intermediate network 1120 can be one of, or a combination of more than one of, a public, private or hosted network; intermediate network 1120, if any, can be a backbone network or the Internet; in particular, intermediate network 1120 can comprise two or more sub-networks (not shown).

The communication system of FIG. 11 as a whole enables connectivity between the connected UEs 1191, 1192 and host computer 1130. The connectivity can be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 can be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which can have storage and/or processing capabilities. In particular, processing circuitry 1218 can comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 can be operable to provide a service to a remote user, such as UE 1230 connecting via OTT connection 1250 terminating at UE 1230 and host computer 1210. In providing the service to the remote user, host application 1212 can provide user data which is transmitted using OTT connection 1250.

Communication system 1200 can also include base station 1220 provided in a telecommunication system and comprising hardware 1225 enabling it to communicate with host computer 1210 and with UE 1230. Hardware 1225 can include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 can be configured to facilitate connection 1260 to host computer 1210. Connection 1260 can be direct, or it can pass through a core network (not shown in FIG. 12) of the telecommunication system and/or through one or more intermediate networks outside the telecommunication system. In the embodiment shown, hardware 1225 of base station 1220 can also include processing circuitry 1228, which can comprise one or more programmable processors, application-specific integrated circuits, field programmable gate arrays or combinations of these (not shown) adapted to execute instructions.

Base station 1220 also includes software 1221 stored internally or accessible via an external connection. For example, software 1221 can include program instructions (also referred to as a computer program product) that, when executed by processing circuitry 1228, can configure base station 1220 to perform operations corresponding to various exemplary methods (e.g., procedures) described herein.

Communication system 1200 can also include UE 1230 already referred to, whose hardware 1235 can include radio interface 1237 configured to set up and maintain wireless connection 1270 with a base station serving a coverage area in which UE 1230 is currently located. Hardware 1235 of UE 1230 can also include processing circuitry 1238, which can comprise one or more programmable processors, application-specific integrated circuits, field programmable gate arrays or combinations of these (not shown) adapted to execute instructions.

UE 1230 also includes software 1231, which is stored in or accessible by UE 1230 and executable by processing circuitry 1238. Software 1231 includes client application 1232. Client application 1232 can be operable to provide a service to a human or non-human user via UE 1230, with the support of host computer 1210. In host computer 1210, an executing host application 1212 can communicate with the executing client application 1232 via OTT connection 1250 terminating at UE 1230 and host computer 1210. In providing the service to the user, client application 1232 can receive request data from host application 1212 and provide user data in response to the request data. OTT connection 1250 can transfer both the request data and the user data. Client application 1232 can interact with the user to generate the user data that it provides. Software 1231 can also include program instructions (also referred to as a computer program product) that, when executed by processing circuitry 1238, can configure UE 1230 to perform operations corresponding to various exemplary methods (e.g., procedures) described herein.

Figure 12:
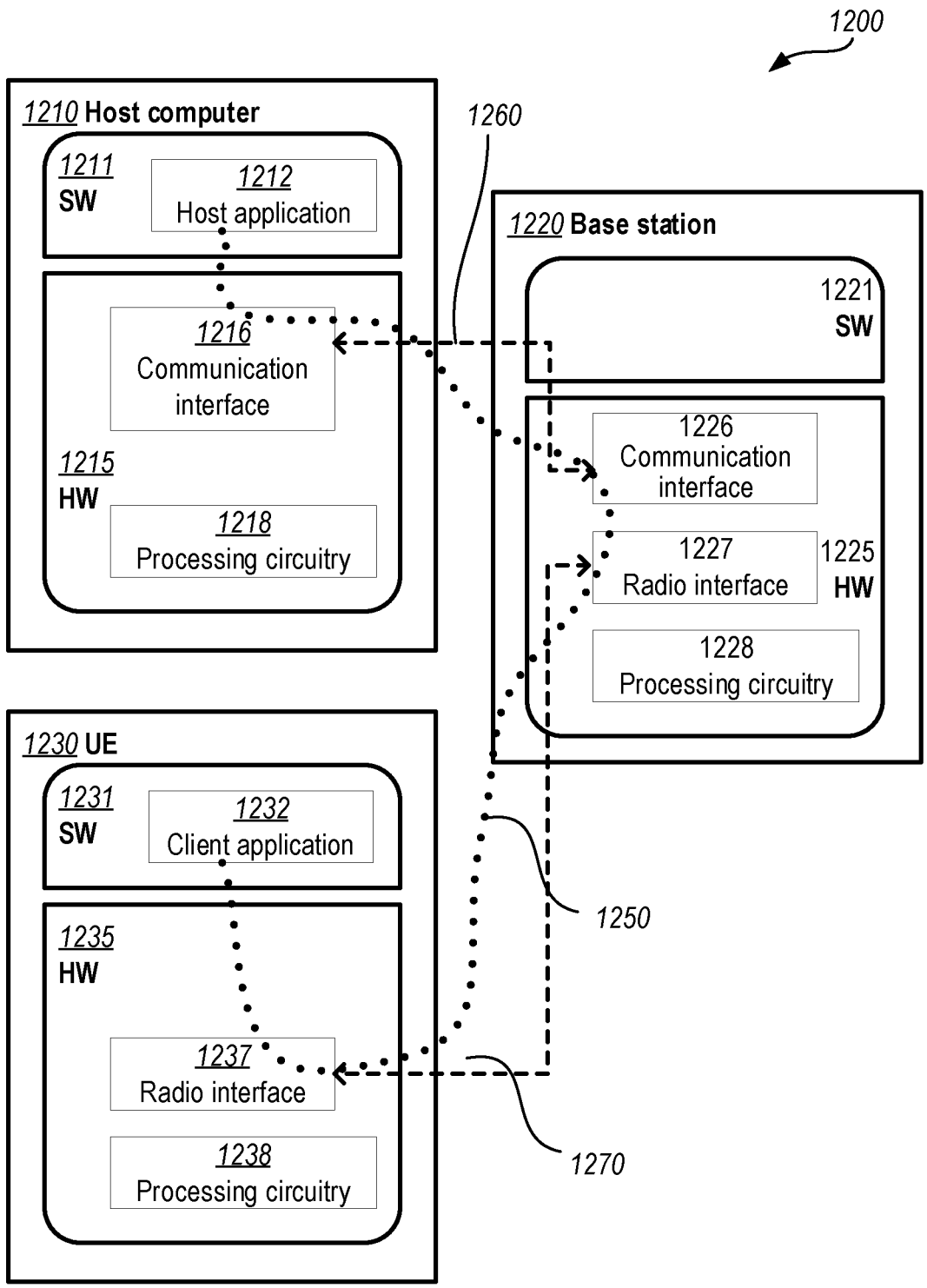

As an example, host computer 1210, base station 1220 and UE 1230 illustrated in FIG. 12 can be similar or identical to host computers or base stations described in relation to other figures herein. For example, the inner workings of these entities can be as shown in FIG. 12 and independently, the surrounding network topology can be that shown in other figures herein.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure can determine the routing, which it can be configured to hide from UE 1230 or from the service provider operating host computer 1210, or both. While OTT connection 1250 is active, the network infrastructure can further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1250 between host computer 1210 and UE 1230, in response to variations in the measurement results. The measurement procedure and/or the network functionality for reconfiguring OTT connection 1250 can be implemented in software 1211 and hardware 1215 of host computer 1210 or in software 1231 and hardware 1235 of UE 1230, or both. In embodiments, sensors (not shown) can be deployed in or in association with communication devices through which OTT connection 1250 passes; the sensors can participate in the measurement procedure by supplying values of the monitored quantities exemplified above, or supplying values of other physical quantities from which software 1211, 1231 can compute or estimate the monitored quantities. The reconfiguring of OTT connection 1250 can include message format, retransmission settings, preferred routing etc.; the reconfiguring need not affect base station 1220, and it can be unknown or imperceptible to base station 1220. Such procedures and functionalities can be known and practiced in the art. In certain embodiments, measurements can involve proprietary UE signaling facilitating host computer 1210's measurements of throughput, propagation times, latency and the like. The measurements can be implemented in that software 1211 and 1231 causes messages to be transmitted, in particular empty or 'dummy' messages, using OTT connection 1250 while it monitors propagation times, errors, etc.

FIG. 13 is a flowchart illustrating an exemplary method (e.g., procedure) implemented in a communication system, in accordance with one embodiment. The communication system includes a host computer, a base station and a UE which, in some exemplary embodiments, can be those described with reference to other figures herein. For simplicity of the present disclosure, only drawing references to FIG. 13 will be included in this section. In operation 1310, the host computer provides user data. In sub-operation 1311 (which can be optional) of operation 1310, the host computer provides the user data by executing a host application. In operation 1320, the host computer initiates a transmission carrying the user data to the UE. In operation 1330 (which can be optional), the base station transmits to the UE the user data which was carried in the transmission that the host computer initiated, in accordance with the teachings of the embodiments described throughout this disclosure. In operation 1340 (which can also be optional), the UE executes a client application associated with the host application executed by the host computer.

FIG. 14 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 14 will be included in this section. In operation 1410 of the method, the host computer provides user data. In an optional sub-operation (not shown) the host computer provides the user data by executing a host application. In operation 1420, the host computer initiates a transmission carrying the user data to the UE. The transmission can pass via the base station, in accordance with the teachings of the embodiments described throughout this disclosure. In operation 1430 (which can be optional), the UE receives the user data carried in the transmission.

FIG. 15 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 15 will be included in this section. In operation 1510 (which can be optional), the UE receives input data provided by the host computer. Additionally or alternatively, in operation 1520, the UE provides user data. In sub-operation 1521 (which can be optional) of operation 1520, the UE provides the user data by executing a client application. In sub-operation 1511 (which can be optional) of operation 1510, the UE executes a client application which provides the user data in reaction to the received input data provided by the host computer. In providing the user data, the executed client application can further consider user input received from the user. Regardless of the specific manner in which the user data was provided, the UE initiates, in sub-operation 1530 (which can be optional), transmission of the user data to the host computer. In operation 1540 of the method, the host computer receives the user data transmitted from the UE, in accordance with the teachings of the embodiments described throughout this disclosure.

FIG. 16 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 16 will be included in this section. In operation 1610 (which can be optional), in accordance with the teachings of the embodiments described throughout this disclosure, the base station receives user data from the UE. In operation 1620 (which can be optional), the base station initiates transmission of the received user data to the host computer. In operation 1630 (which can be optional), the host computer receives the user data carried in the transmission initiated by the base station.

The exemplary embodiments described herein provide techniques for configuring and signalling transmit and receive polarization modes supported by a UE for operation in a 3GPP non-terrestrial network (NTN). Such embodiments facilitate spectrally efficient performance of downlink and uplink between a satellite and a UE, and enable accurate measurement of signal strength and/or quality by UEs under dominate LOS conditions, thereby facilitating correct and efficient management of UE mobility. When used in UEs and/or network nodes, such as described herein, exemplary embodiments described herein can provide various improvements, benefits, and/or advantages that enable UEs to access network resources and OTT services more consistently and without interruption. This improves the availability and/or performance of these services as experienced by OTT service providers and end-users, including more consistent data throughout and fewer delays without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the methods, apparatus, and computer-readable media described herein include, but are not limited to, the following enumerated examples:

E1. A method for operating a user equipment (UE) in a non-terrestrial network (NTN) that utilizes one or more polarization modes for serving a plurality of cells, the method comprising:
  sending, to a network node, an indication of one or more polarization capabilities of the UE; and
  transmitting and/or receiving one or more signals or channels in a first cell of the NTN according to the indicated polarization capabilities.

E2. The method of embodiment E1, wherein the one or more polarization capabilities include one or more of the following:
  a UE type,
  one or more polarization modes supported by the UE,
  a polarization correspondence, between uplink and downlink signals, supported by the UE, and
  a list of antenna panels supported by the UE and polarization modes supported by the respective antenna panels.

E3. The method of any of embodiments E1-E2, wherein transmitting and/or receiving one or more signals or channels further comprises:
  receiving a downlink signal or channel transmitted in the first cell according to a first polarization mode; and
  determining a second polarization mode for an uplink signal or channel based on the first polarization mode and a polarization correspondence supported by the UE; and
  transmitting the uplink signal or channel according to the second polarization mode.

E4. The method of embodiment E3, wherein:
  the downlink signal or channel is one of the following: a primary synchronization signal, a secondary synchronization signal, and a broadcast control channel (BCCH);
  the uplink signal or channel is one of the following: a random-access channel (RACH), and a Physical Uplink Shared Channel (PUSCH); and
  the second polarization mode is the same as the first polarization mode.

E5. The method of any of embodiments E1-E2, wherein transmitting and/or receiving one or more signals or channels further comprises:
  receiving, from the network node, a radio resource configuration based on the indicated polarization capabilities; and
  transmitting and/or receiving the one or more signals or channels according to the radio resource configuration.

E6. The method of embodiment E5, wherein the radio resource configuration includes one or more of the following: aggregation factor, modulation and coding scheme (MCS) table, time domain resource allocation (TDRA) table, frequency resource allocation, block error rate (BER) target, physical resource block (PRB) bundling configuration, physical downlink shared channel (PDSCH) mapping, physical uplink shared channel (PUSCH) transmission scheme, and hybrid ARQ (HARD) process configuration.

E7. The method of any of embodiments E1-E6, wherein:
  the one or more signals or channels are transmitted and/or received, in the first cell, according to a first polarization mode supported by the UE; and
  the method further comprises transmitting and/or receiving one or more further signals or channels, in the first cell or a second cell, according to a second polarization mode supported by the UE,
  wherein the first and second polarization modes are orthogonal.

E8. The method of embodiment E7, wherein:
  the one or more signals or channels include a first physical downlink channel received in the first cell;
  the one or more further signals or channels include a second physical downlink channel received in the second cell; and
  the first and second physical downlink channels are received concurrently by the UE.

E9. The method of any of embodiments E7-E8, wherein:
  the one or more signals or channels are transmitted and/or received using a first antenna panel supporting the first polarization mode; and
  the one or more further signals or channels are transmitted and/or received using a second antenna panel supporting the second polarization mode.

E10. The method of any of embodiments E1-E9, wherein transmitting and/or receiving one or more signals or channels further comprises:
  receiving, from the network node, an indication of one or more polarization modes used for serving the first cell; and
  based on determining that polarization modes supported by the UE do not match any of the one or more polarization modes used for serving the first cell, refraining from transmitting signals or channels in the first cell.

E11. A method for operating a non-terrestrial network (NTN) using one or more polarization modes for serving a plurality of cells, the method comprising:
  receiving, from a user equipment (UE) in a first cell of the NTN, an indication of one or more polarization capabilities of the UE; and
  transmitting and/or receiving one or more signals or channels in the first cell according to the indicated polarization capabilities of the UE.

E12. The method of embodiment E11, wherein the one or more polarization capabilities include one or more of the following:
  a UE type,
  one or more polarization modes supported by the UE,
  a polarization correspondence, between uplink and downlink signals, supported by the UE, and
  a list of antenna panels supported by the UE and polarization modes supported by the respective antenna panels.

E13. The method of any of embodiments E11-E12, wherein transmitting and/or receiving one or more signals or channels further comprises:
  transmitting a downlink signal or channel in the first cell according to a first polarization mode; and
  determining a second polarization mode for an uplink signal or channel based on the first polarization mode and a polarization correspondence supported by the UE; and
  receiving the uplink signal or channel, from the UE, according to the second polarization mode.

E14. The method of embodiment E13, wherein:
  the downlink signal or channel is one of the following: a primary synchronization signal, a secondary synchronization signal, and a broadcast control channel (BCCH);
  the uplink signal or channel is one of the following: a random-access channel (RACH), and a Physical Uplink Shared Channel (PUSCH); and
  the second polarization mode is the same as the first polarization mode.

E15. The method of any of embodiments E11-E12, wherein transmitting and/or receiving one or more signals or channels further comprises:
  transmitting, to the UE, a radio resource configuration based on the indicated polarization capabilities; and
  transmitting or receiving the one or more signals or channels according to the radio resource configuration.

E16. The method of embodiment E15, wherein the radio resource configuration includes one or more of the following: aggregation factor, modulation and coding scheme (MCS) table, time domain resource allocation (TDRA) table, frequency resource allocation, block error rate (BER) target, physical resource block (PRB) bundling configuration, physical downlink shared channel (PDSCH) mapping, physical uplink shared channel (PUSCH) transmission scheme, and HARQ process configuration.

E17. The method of any of embodiments E11-E16, wherein:
  the one or more signals or channels are transmitted and/or received, in the first cell, according to a first polarization mode supported by the UE; and
  the method further comprises transmitting and/or receiving one or more further signals or channels, in the first cell or a second cell, according to a second polarization mode supported by the UE,
  wherein the first and second polarization modes are orthogonal.

E18. The method of embodiment E17, wherein:
  the one or more signals or channels include a first physical downlink channel transmitted in the first cell;
  the one or more further signals or channels include a second physical downlink channel transmitted in the second cell; and
  the first and second physical downlink channels are transmitted concurrently.

E19. The method of any of embodiments E11-E18, wherein transmitting and/or receiving one or more signals or channels further comprises broadcasting, in the first cell, an indication of one or more polarization modes used for serving the first cell.

E20. The method of embodiment E19, wherein:
  transmitting and/or receiving one or more signals or channels further comprises transmitting an indication of a UE access restriction based on polarization capabilities supported by the UE;
  the access restriction applies to at least the first cell; and
  the indication is transmitted according to one of the following:
    broadcast in the first cell; and
    as a dedicated message to the UE in response to the received indication of the one or more polarization capabilities of the UE.

E21. A user equipment (UE) configured to operate in a non-terrestrial network (NTN) that utilizes one or more polarization modes for serving a plurality of cells, the UE comprising:
  radio interface circuitry configured to communicate with a network node via at least one cell; and
  processing circuitry operably coupled to the radio interface circuitry, whereby the processing circuitry and the radio interface circuitry are configured to perform operations corresponding to any of the methods of embodiments E1-E10.

E22. A user equipment (UE) configured to operate in a non-terrestrial network (NTN) that utilizes one or more polarization modes for serving a plurality of cells, the UE being further arranged to perform operations corresponding to any of the methods of embodiments E1-E10.

E23. A non-transitory, computer-readable medium storing computer-executable instructions that, when executed by processing circuitry of a user equipment (UE), configure the UE to perform operations corresponding to any of the methods of embodiments E1-E10.

E24. A computer program product comprising computer-executable instructions that, when executed by processing circuitry of a user equipment (UE), configure the UE to perform operations corresponding to any of the methods of embodiments E1-E10.

E25. A network node configured to serve at least one cell in a non-terrestrial network (NTN) that utilizes one or more polarization modes for serving a plurality of cells, the network node comprising:
  radio interface circuitry configured to communicate with user equipment (UEs) via the at least one cell; and
  processing circuitry operably coupled to the radio interface circuitry, whereby the processing circuitry and the radio interface circuitry are configured to perform operations corresponding to any of the methods of embodiments E11-E20.

E26. A network node configured to serve at least one cell in a non-terrestrial network (NTN) that utilizes one or more polarization modes for serving a plurality of cells, the network node being further arranged to perform operations corresponding to any of the methods of embodiments E11-E20.

E27. A non-transitory, computer-readable medium storing computer-executable instructions that, when executed by processing circuitry of a network node in a non-terrestrial network (NTN), configure the network node to perform operations corresponding to any of the methods of embodiments E11-E20.

E28. A computer program product comprising computer-executable instructions that, when executed by processing circuitry of a network node in a non-terrestrial network (NTN), configure the network node to perform operations corresponding to any of the methods of embodiments E11-E20.

The invention claimed is:

1. A method for operating a user equipment (UE) in a non-terrestrial network (NTN) that utilizes one or more polarization modes for serving one or more cells, the method comprising:
  sending, to a network node, an indication of one or more polarization capabilities of the UE; and
  transmitting and/or receiving one or more signals or channels in a first cell of the NTN according to the indicated polarization capabilities of the UE, wherein:
  the one or more signals or channels include a first physical downlink channel received in the first cell according to a first polarization mode that is indicated as supported by the UE;
  the method further comprises receiving a second physical downlink channel received in the first cell or in a second cell, according to a second polarization mode indicated as supported by the UE;

the first and second polarization modes are orthogonal; and the first and second physical downlink channels are received concurrently by the UE.

2. The method of claim 1, wherein the indicated polarization capabilities of the UE include one or more of the following:
a UE type,
one or more polarization modes supported by the UE,
a polarization correspondence between uplink and downlink signals that is supported by the UE, and
a list of antenna panels supported by the UE and polarization modes supported by the respective antenna panels.

3. The method of claim 2, further comprising receiving, from the network node, an indication of one or more of the following polarization capabilities of the first cell:
one or more polarization modes; and
a polarization correspondence between uplink and downlink signals.

4. The method of claim 3, further comprising refraining from transmitting signals or channels in the first cell based on determining at least one of the following:
that polarization modes supported by the UE do not match any of the indicated polarization modes of the first cell; and
that polarization correspondence supported by the UE does not match the indicated polarization correspondence of the first cell.

5. The method of claim 3, wherein the indicated polarization capabilities of the UE are a subset of the indicated polarization capabilities of the first cell.

6. The method of claim 1, wherein transmitting and/or receiving one or more signals or channels further comprises:
receiving a downlink signal or channel in the first cell according to a first polarization mode;
determining a second polarization mode for an uplink signal or channel based on the first polarization mode and a polarization correspondence between uplink and downlink signals that is indicated as supported by the UE; and
transmitting the uplink signal or channel in the first cell according to the second polarization mode.

7. The method of claim 6, wherein:
the downlink signal or channel is one of the following: a primary synchronization signal, a secondary synchronization signal, and a broadcast control channel (BCCH);
the uplink signal or channel is a random-access channel (RACH) or a Physical Uplink Shared Channel (PUSCH); and
the second polarization mode is the same as the first polarization mode.

8. The method of claim 1, wherein transmitting and/or receiving one or more signals or channels further comprises:
receiving, from the network node, a radio resource configuration based on the polarization capabilities indicated as supported by the UE; and
transmitting and/or receiving the one or more signals or channels in the first cell according to the radio resource configuration,
wherein the radio resource configuration includes one or more of the following:
aggregation factor; modulation and coding scheme table; time domain resource allocation table; frequency resource allocation; block error rate target; physical resource block bundling configuration; physical downlink shared channel (PDSCH) mapping; physical uplink shared Channel (PUSCH), transmission scheme; and hybrid ARQ process configuration.

9. The method of claim 1, wherein:
the one or more signals or channels are transmitted and/or received using a first antenna panel supporting the first polarization mode; and
the one or more further signals or channels are transmitted and/or received using a second antenna panel supporting the second polarization mode.

10. A method for operating a network node in a non-terrestrial network (NTN) that utilizes one or more polarization modes for serving one or more cells, the method comprising:
receiving, from a user equipment (UE) in a first cell of the NTN, an indication of one or more polarization capabilities of the UE; and
transmitting and/or receiving one or more signals or channels in the first cell according to the indicated polarization capabilities of the UE, wherein:
the one or more signals or channels include a first physical downlink channel transmitted in the first cell according to a first polarization mode that is indicated as supported by the UE;
the method further comprises transmitting a second physical downlink channel in the first cell or a second cell, according to a second polarization mode that is indicated as supported by the UE;
the first and second polarization modes are orthogonal; and
the first and second physical downlink channels are transmitted concurrently.

11. The method of claim 10, wherein the indicated polarization capabilities of the UE include one or more of the following:
a UE type,
one or more polarization modes supported by the UE,
a polarization correspondence between uplink and downlink signals that is supported by the UE, and
a list of antenna panels supported by the UE and polarization modes supported by the respective antenna panels.

12. The method of claim 11, further comprising transmitting, to at least the UE, an indication of one or more of the following polarization capabilities of the first cell:
one or more polarization modes; and
a polarization correspondence between uplink and downlink signals,
wherein the indicated polarization capabilities of the UE are a subset of the indicated polarization capabilities of the first cell.

13. The method of claim 11, further comprising selecting a second cell for a mobility operation for the UE, based on the second cell supporting one of the polarization modes indicated as supported by the UE.

14. The method of claim 10, wherein transmitting and/or receiving one or more signals or channels further comprises:
transmitting a downlink signal or channel in the first cell according to a first polarization mode;
determining a second polarization mode for an uplink signal or channel based on the first polarization mode and a polarization correspondence between uplink and downlink signals that is indicated as supported by the UE; and
receiving, from the UE, the uplink signal or channel in the first cell according to the second polarization mode.

15. The method of claim 14, wherein:
- the downlink signal or channel is one of the following: a primary synchronization signal, a secondary synchronization signal, and a broadcast control channel (BCCH);
- the uplink signal or channel is a random-access channel (RACH) or a Physical Uplink Shared Channel (PUSCH); and
- the second polarization mode is the same as the first polarization mode.

16. The method of claim 10, wherein transmitting and/or receiving one or more signals or channels further comprises:
- transmitting, to the UE, a radio resource configuration based on the polarization capabilities indicated as supported by the UE; and
- transmitting and/or receiving the one or more signals or channels in the first cell according to the radio resource configuration,
- wherein the radio resource configuration includes one or more of the following:
  - aggregation factor; modulation and coding scheme table; time domain resource allocation table; frequency resource allocation; block error rate target; physical resource block bundling configuration; physical downlink shared channel (PDSCH) mapping; physical uplink shared Channel (PUSCH), transmission scheme; and hybrid ARQ process configuration.

* * * * *